US012126095B2

(12) United States Patent
Jang et al.

(10) Patent No.: US 12,126,095 B2
(45) Date of Patent: Oct. 22, 2024

(54) ELECTRONIC DEVICE COMPRISING ANTENNA

(71) Applicant: SAMSUNG ELECTRONICS CO., LTD., Suwon-si (KR)

(72) Inventors: Kyihyun Jang, Suwon-si (KR); Jiho Kim, Suwon-si (KR); Seongyong An, Suwon-si (KR); Moohyun Roh, Suwon-si (KR); Gyubok Park, Suwon-si (KR); Kyungmoon Seol, Suwon-si (KR); Jaewon Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 17/971,165

(22) Filed: Oct. 21, 2022

(65) Prior Publication Data
US 2023/0051681 A1    Feb. 16, 2023

Related U.S. Application Data

(63) Continuation of application No. PCT/KR2021/005098, filed on Apr. 22, 2021.

(30) Foreign Application Priority Data

Apr. 22, 2020  (KR) ........................ 10-2020-0048891

(51) Int. Cl.
*H01Q 5/314*    (2015.01)
*H01Q 1/24*     (2006.01)
(Continued)

(52) U.S. Cl.
CPC ............. *H01Q 5/314* (2015.01); *H01Q 1/243* (2013.01); *H01Q 1/38* (2013.01); *H04B 7/0413* (2013.01)

(58) Field of Classification Search
CPC .......... H01Q 5/30; H01Q 5/307; H01Q 5/314; H01Q 5/321; H01Q 1/24; H01Q 1/242;
(Continued)

(56) References Cited

U.S. PATENT DOCUMENTS

| 9,105,986 B2 | 8/2015 | Mahanfar et al. |
| 10,312,573 B2 | 6/2019 | Kim et al. |

(Continued)

FOREIGN PATENT DOCUMENTS

| KR | 10-1551721 B1 | 9/2015 |
| KR | 10-2017-0031217 A | 3/2017 |

(Continued)

OTHER PUBLICATIONS

Communication dated Sep. 19, 2023, issued by the European Patent Office in European Application No. 21793098.1.
(Continued)

*Primary Examiner* — Jason M Crawford
(74) *Attorney, Agent, or Firm* — Sughrue Mion, PLLC

(57) ABSTRACT

An electronic device includes: a side member forming sides of the electronic device, the side member including a first conductive portion, a second conductive portion, a first non-conductive portion, and a slit; a printed circuit board including the ground; and a wireless communication circuit, wherein the first conductive portion includes a first electrical path and a second electrical path, the second conductive portion includes a third electrical path and a fourth electrical path, a capacitor is arranged along the third electrical path, and the wireless communication circuit may feed, to the first conductive portion via the first electrical path, an RF signal of a first frequency band and may feed, to the second conductive portion via the third electrical path, an RF signal of a second frequency band which at least partially overlaps the first frequency band.

20 Claims, 19 Drawing Sheets

(51) Int. Cl.
  *H01Q 1/38* (2006.01)
  *H04B 7/0413* (2017.01)

(58) Field of Classification Search
  CPC . H01Q 1/243; H04B 7/02; H04B 7/04; H04B 7/0413
  See application file for complete search history.

(56) References Cited

U.S. PATENT DOCUMENTS

| | | | |
|---|---|---|---|
| 10,333,199 | B2 | 6/2019 | Hobson et al. |
| 10,477,675 | B1 | 11/2019 | Kim et al. |
| 10,547,099 | B2 | 1/2020 | Park et al. |
| 10,700,416 | B2* | 6/2020 | Jung ............... H01Q 13/10 |
| 11,362,699 | B2* | 6/2022 | Jung ............... H04M 1/0202 |
| 2016/0056527 | A1 | 2/2016 | Pascolini et al. |
| 2018/0034148 | A1* | 2/2018 | Nam ............... H01Q 1/50 |
| 2018/0205146 | A1 | 7/2018 | Huang |
| 2018/0277929 | A1* | 9/2018 | Seo ............... H01Q 1/241 |
| 2018/0277934 | A1 | 9/2018 | Kim et al. |
| 2018/0287246 | A1 | 10/2018 | Kim et al. |
| 2018/0358699 | A1 | 12/2018 | Li et al. |
| 2019/0036210 | A1* | 1/2019 | Kim ............... H01Q 13/10 |
| 2019/0165836 | A1* | 5/2019 | Irci ............... H04B 5/72 |
| 2019/0393586 | A1 | 12/2019 | Ayala Vazquez et al. |
| 2020/0007184 | A1* | 1/2020 | Jung ............... H04B 1/525 |
| 2020/0076056 | A1* | 3/2020 | Froese ............... H01Q 13/10 |
| 2020/0076059 | A1 | 3/2020 | Hsiao et al. |
| 2020/0119429 | A1 | 4/2020 | Park et al. |
| 2022/0294099 | A1* | 9/2022 | Choi ............... H01Q 5/335 |
| 2023/0046925 | A1* | 2/2023 | Jang ............... H01Q 1/46 |
| 2023/0051681 | A1* | 2/2023 | Jang ............... H04B 1/3888 |
| 2023/0112380 | A1* | 4/2023 | Jang ............... H01Q 21/28 343/702 |
| 2023/0208950 | A1* | 6/2023 | Jang ............... H04M 1/026 455/575.7 |
| 2023/0299466 | A1* | 9/2023 | An ............... H01Q 5/385 361/807 |

FOREIGN PATENT DOCUMENTS

| | | |
|---|---|---|
| KR | 10-2017-0051064 A | 5/2017 |
| KR | 10-1837484 B1 | 3/2018 |
| KR | 10-2018-0108147 A | 10/2018 |
| KR | 10-1958789 B1 | 7/2019 |
| KR | 10-2019-0094454 A | 8/2019 |
| KR | 10-2019-0140244 A | 12/2019 |
| KR | 10-2020-0026000 A | 3/2020 |

OTHER PUBLICATIONS

International Search Report dated Aug. 6, 2021 issued by the International Searching Authority in International Application No. PCT/KR2021/005098 (PCT/ISA/210).

Written Opinion dated Aug. 6, 2021 issued by the International Searching Authority in International Application No. PCT/KR2021/005098 (PCT/ISA/237).

Communication dated Apr. 29, 2024, issued by the Korean Patent Office in Korean Application No. 10-2020-0048891.

* cited by examiner

ELECTRONIC DEVICE COMPRISING ANTENNA

CROSS-REFERENCE TO RELATED APPLICATION

This application is a continuation application of International Application No. PCT/KR2021/005098, filed on Apr. 22, 2021, which is based on and claims priority to Korean Patent Application No. 10-2020-0048891, filed on Apr. 22, 2020, in the Korean Intellectual Property Office, the disclosures of which are incorporated by reference herein in their entireties.

BACKGROUND

1. Field

The disclosure relates to an electronic device including an antenna.

2. Description of Related Art

With the development of information and communication technology and semiconductor technology, electronic devices are increasingly being used in various fields and providing various functions.

For example, an electronic device can provide a wireless communication service, to exchange information with an external electronic device and process the information. The electronic device can transmit or receive various types of information such as a text, an image, a video, or a voice through the wireless communication service.

The electronic device capable of providing the wireless communication service may include a plurality of antennas for transmitting and/or receiving radio frequency (RF) signals of various frequency bands of wireless communication services (e.g., LTE, WiFi, NFC, or Bluetooth).

As the capacity of data transmitted or received through a wireless communication service has rapidly increased, the number of electronic devices employing a multiple input and multiple output (MIMO) technology capable of increasing the capacity of transmitted or received data has increased.

The electronic device can implement, for example, a MIMO technology, by using, as an antenna radiator, a conductive portion included in a side member forming a side surface of the electronic device and a conductive pattern (e.g., a laser direct structure (LDS) pattern) disposed in at least one area of the side member adjacent to the conductive portion.

However, an opening through which an RF signal radiated from the conductive pattern in the electronic device can be radiated to the outside of the electronic device may be insufficient, and radiation performance may be deteriorated due to the ground of a printed circuit board adjacent to the conductive pattern, so the electronic device using the conductive pattern as the antenna radiator may not secure sufficient antenna performance (e.g., antenna gain) for implementing the MIMO technology.

Also, in the above-described electronic device, a beam pattern directed toward a display may not be formed according to a position where the conductive pattern is disposed, so the antenna performance (e.g., radiation performance) of the electronic device may be deteriorated according to an environment in which a user uses the electronic device.

SUMMARY

Provided is an electronic device capable of securing the radiation performance of an antenna, by using, as a MIMO antenna radiator, a plurality of conductive portions included in a side member formed on a side surface of the electronic device.

According to an aspect of the disclosure, an electronic device includes: a side member forming a side surface of the electronic device, the side member including: a first conductive portion, a second conductive portion adjacent to the first conductive portion, a first non-conductive portion provided between the first conductive portion and the second conductive portion, and a slit formed in an area adjacent to the second conductive portion; a printed circuit board including a ground; a capacitor; and a wireless communication circuit electrically connected to the first conductive portion and the second conductive portion, wherein the first conductive portion includes a first electrical path between a first point of the first conductive portion and the wireless communication circuit and a second electrical path between a second point of the first conductive portion and the ground, wherein the second conductive portion includes a third electrical path between a third point of the second conductive portion and the wireless communication circuit and a fourth electrical path between a fourth point of the second conductive portion and the ground, wherein the capacitor is provided on the third electrical path, and wherein the wireless communication circuit is configured to feed a radio frequency (RF) signal of a first frequency band to the first conductive portion via the first electrical path, and feed an RF signal of a second frequency band to the second conductive portion via the third electrical path, and the second frequency band at least partially overlaps the first frequency band.

At least a part of the first conductive portion may be configured to operate as an antenna radiator for transmitting or receiving the RF signal of the first frequency band.

The slit may be configured to operate as a slit antenna for transmitting or receiving the RF signal of the second frequency band.

The first frequency band and the second frequency band may be substantially the same as each other.

The first conductive portion and the slit may be configured to operate as a multiple input and multiple output (MIMO) antenna.

The first frequency band or the second frequency band may be 2.2 GHz to 2.7 GHz.

The wireless communication circuit may be further configured to support a WiFi protocol.

The second conductive portion may further include a fifth electrical path between a fifth point, adjacent to the first conductive portion, of the second conductive portion and the ground of the printed circuit board, and the electronic device may further include a first passive element provided on the fifth electrical path.

The fifth point of the second conductive portion may be located between the first point of the first conductive portion and the third point of the second conductive portion.

The electronic device may further include a switch circuit at a fifth point adjacent to the first conductive portion, the second conductive portion may be electrically connected to the switch circuit, and the switch circuit may be configured to selectively connect the second conductive portion to a second passive element or the ground of the printed circuit board.

The electronic device may further include a processor electrically connected to the switch circuit and configured to control an electrical connection state of the switch circuit.

The side surface may include: a first side surface extending along a first direction; a second side surface parallel to the first side surface; a third side surface extending along a second direction perpendicular to the first direction, and connecting a first end of the first side surface and a first end of the second side surface; and a fourth side surface parallel to the third side surface and connecting a second end of the first side surface and a second end of the second side surface.

The first conductive portion may be provided in at least one area of the second side surface and at least one area of the third side surface, and the second conductive portion may be adjacent to the first conductive portion and is provided on the third side surface.

The first conductive portion may further include a first protrusion protruding toward the printed circuit board at the first point.

The second conductive portion may further include: a second protrusion protruding toward the printed circuit board at the third point; and a third protrusion protruding toward the printed circuit board at the fifth point.

An electronic device of an embodiment of the present disclosure may improve the radiation performance of an antenna, by using, as a MIMO antenna radiator, a plurality of conductive portions forming a side surface of the electronic device.

Also, an electronic device of an embodiment of the present disclosure may improve a directivity of an antenna, since it may form an antenna beam pattern directed toward a display.

In addition, an electronic device of an embodiment of the present disclosure may improve a space utilization in the electronic device, by using, as an antenna radiator of a MIMO antenna, a plurality of conductive portions forming a side surface of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
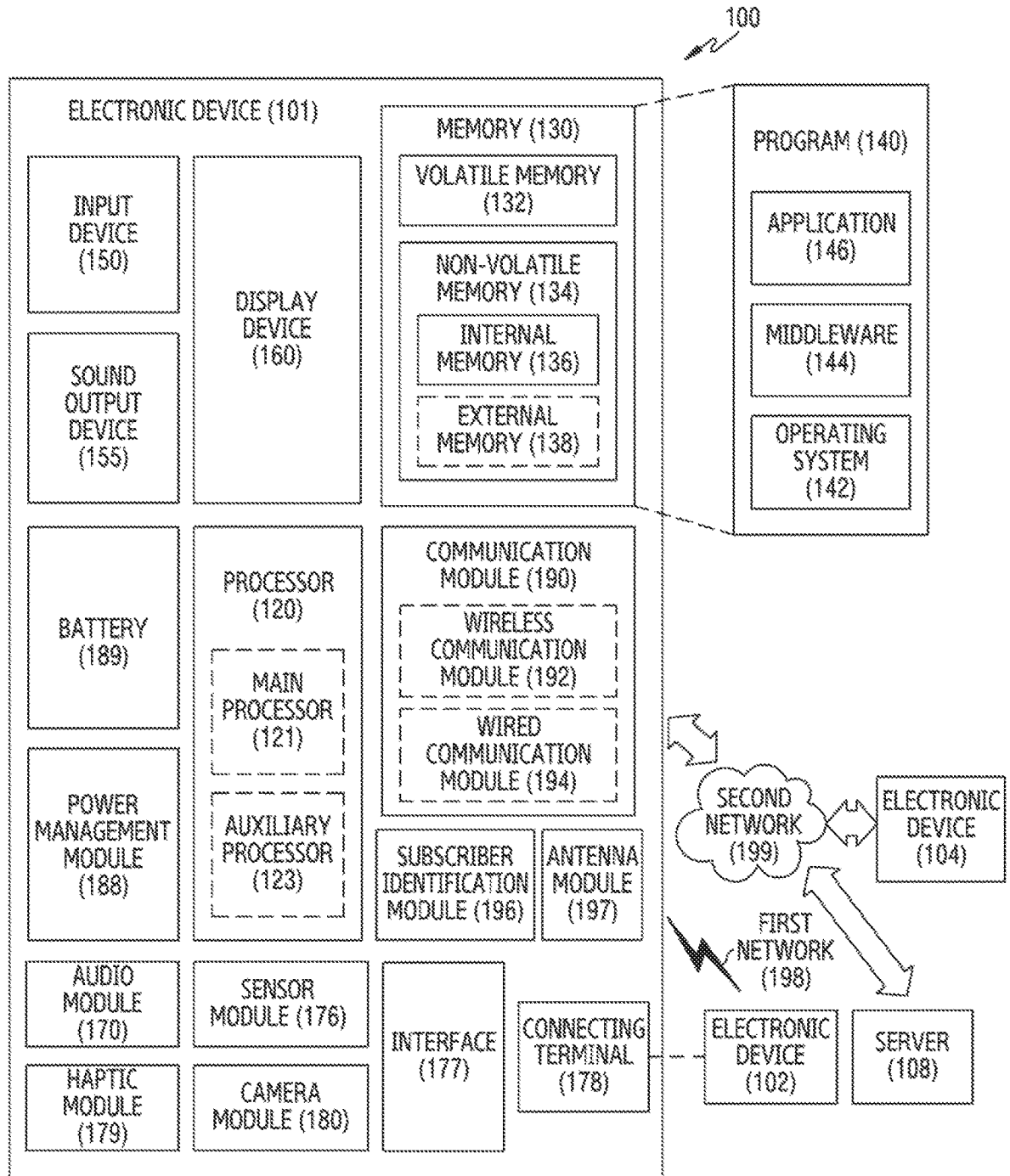
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., via a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., via a wire) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via a wire), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
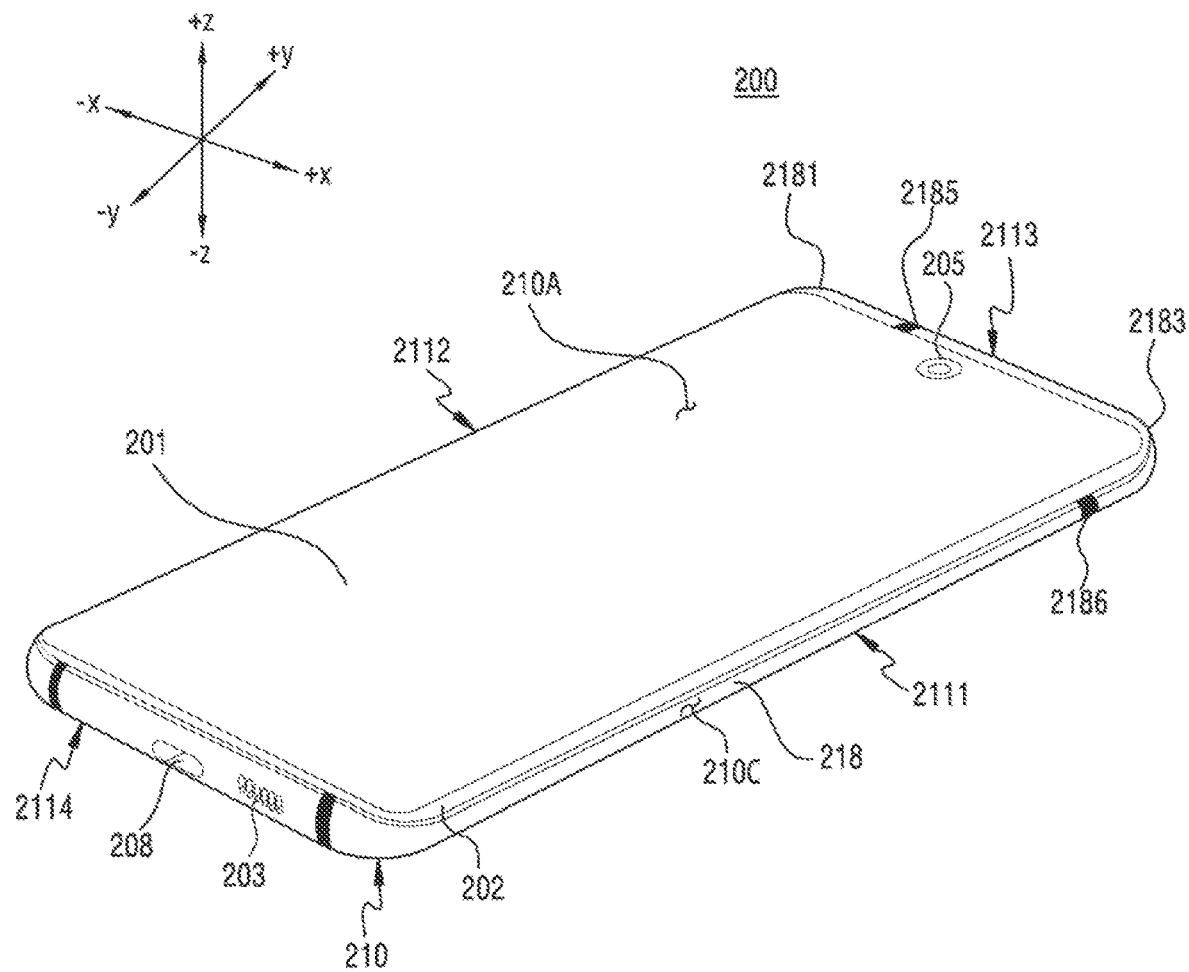
FIG. 2A is a perspective view illustrating a front surface of an electronic device according to an embodiment.
Figure 2B:
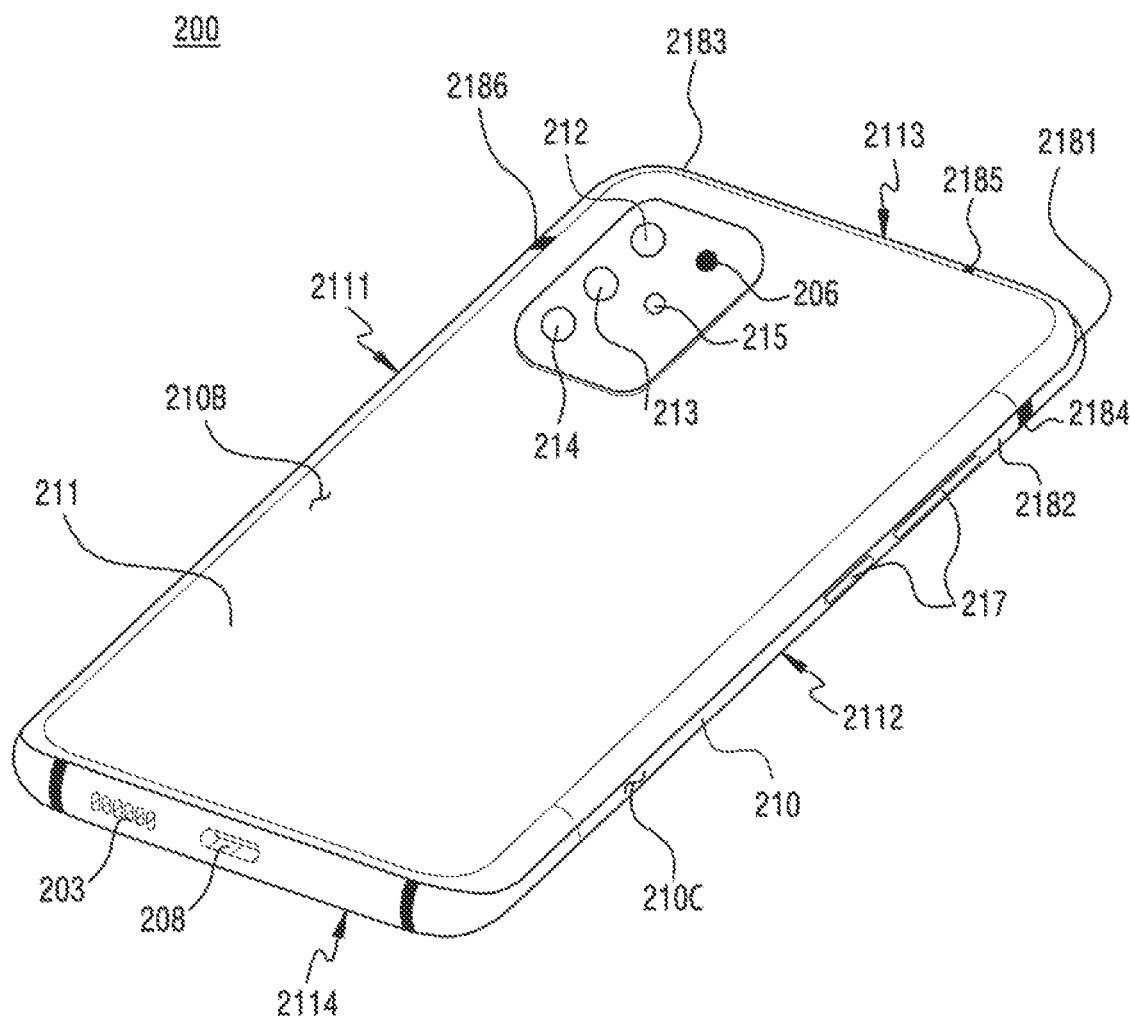
FIG. 2B is a perspective view illustrating a rear surface of the electronic device of FIG. 2A.
Figure 2B:
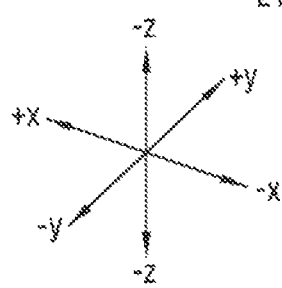

FIG. 2A is a perspective view illustrating a front surface of the electronic device 200 according to an embodiment, and FIG. 2B is a perspective view illustrating a rear surface of the electronic device 200 of FIG. 2A.

Referring to FIG. 2A and FIG. 2B, the electronic device 200 of an embodiment may include a housing 210 including a first surface (or a front surface) 210A, a second surface (or a rear surface) 210B, and a side surface (or a sidewall) 210C surrounding a space between the first surface 210A and the second surface 210B. In another embodiment, the housing 210 may refer to a structure that forms a part of the first surface 210A, the second surface 210B, and the side surface 210C of FIG. 2A as well.

According to an embodiment, the first surface 210A may be formed by a front plate 202 (e.g., a glass plate including various coating layers, or a polymer plate) whose at least portion is substantially transparent. According to an embodiment, the front plate 202 may include a curved portion bent and extended seamlessly from the first surface 210A toward a rear plate 211 in at least one side edge portion.

According to an embodiment, the second surface 210B may be formed by the rear plate 211 that is substantially opaque. In an example, the rear plate 211 may be formed by a coated or tinted glass, a ceramic, a polymer, a metal (e.g., aluminum, stainless steel (STS), or magnesium), or a combination of at least two of the above materials. According to an embodiment, the rear plate 211 may include a curved portion bent and extended seamlessly from the second surface 210B toward the front plate 202 in at least one side edge portion.

According to an embodiment, the side surface 210C may be coupled to the front plate 202 and the rear plate 211, and be formed by a side member (or a "side bezel structure or sidewall") 218 including a metal and/or polymer. In some embodiment, the rear plate 211 and the side member 218 may be integrally formed and include the same material (e.g., a metal material such as an aluminum). In an example, the side surface 210C may include a first side surface 2111 located at the right side (e.g., an +x direction of FIG. 2A) of the electronic device 200 and extending along a first direction (e.g., a +y direction of FIG. 2A), a second side surface 2112 parallel to the first side surface 2111 and extending along the first direction, a third side surface 2113 extending along a second direction (e.g., the +x direction of FIG. 2A) perpendicular to the first direction and connecting one end (e.g., one end of the +y direction of FIG. 2A) of the first side surface 2111 and one end (e.g., one end of the +y direction of FIG. 2A) of the second side surface 2112, and/or a fourth side surface 2114 parallel to the third side surface 2113 and connecting the other end (e.g., one end of the -y direction of FIG. 2A) of the first side surface 2111 and the other end (e.g., one end of the -y direction of FIG. 2A) of the second side surface 2112.

According to an embodiment, the side member 218 may include at least one conductive portion 2181, 2182, or 2183 and/or at least one non-conductive portion 2184, 2185, or 2186 (or "insulating area"). In an example, the at least one conductive portion may include a first conductive portion 2181, a second conductive portion 2182 and/or a third conductive portion 2183 which form at least one area of the side surface 210c of the electronic device 200. For example, the first conductive portion 2181, the second conductive portion 2182, and/or the third conductive portion 2183 may be located in an upper area (e.g., an area of the +y direction of FIG. 2A and FIG. 2B) of the electronic device 200, to form at least one area of the side surface 210C. In an example, at least one area of the first conductive portion 2181 may be located on the second side surface 2112, and another area of the first conductive portion 2181 may be located in an area where the second side surface 2112 and the third side surface 2113 are connected, and a remaining area of the first conductive portion 2181 may be located on the third side surface 2113. For example, the first conductive portion 2181 may be formed to extend from at least one area of the second side surface 2112 to at least one area of the third side surface 2113. In another example, the second conductive portion 2182 may be located on the third side surface 2113. In a further example, the third conductive portion 2183 may be located between the first side surface 2111 and the third side surface 2113. In an example, the at least one non-conductive portion may include a first non-conductive portion 2184 located between the first conductive portion 2181 and the second conductive portion 2182, a second non-conductive portion 2185 located between the first conductive portion 2181 and one end of the third conductive portion 2183, and/or a third non-conductive portion 2186 located at the other end of the third conductive portion 2183. By the above-described arrangement structure of the first non-conductive portion 2184, the second non-conductive portion 2185, and/or the third non-conductive portion 2186, the first conductive portion 2181, the second conductive portion 2182 and/or the third conductive portion 2183 may be insulated from each other.

According to an embodiment, the first conductive portion 2181, the second conductive portion 2182, and/or the third conductive portion 2183 of the side member 218 may operate as an antenna radiator electrically connected with a wireless communication circuit (e.g., the communication module 190) and transmitting and/or receiving a radio frequency (RF) signal of a specified frequency band. For example, the wireless communication circuit may transmit or feed an RF signal of a specified frequency band to the first conductive portion 2181, the second conductive portion 2182 and/or the third conductive portion 2183, or receive an RF signal of a specified frequency band from the first conductive portion 2181, the second conductive portion 2182, and/or the third conductive portion 2183.

According to an embodiment, the electronic device 200 may include at least one or more of a display 201, an audio module 203, a sensor module, a camera module 205, a key input device 217, and a connector hole 208. In some embodiment, the electronic device 200 may omit at least one (e.g., the key input device 217) of the components or additionally include other components. For example, the electronic device 200 may include the sensor module. For example, within an area presented by the front plate 202, a sensor such as a proximity sensor or an illuminance sensor may be integrated into the display 201, or be disposed adjacent to the display 201. In some embodiment, the electronic device 200 may further include a light emitting element, and the light emitting element may be disposed in a position adjacent to the display 201 within the area presented by the front plate 202. The light emitting element may present, for example, state information of the electronic device 200 in the form of light. In another embodiment, the light emitting element may present, for example, a light source interlocking with an operation of the camera module 205. The light emitting element may include, for example, an LED, an IR LED, and a xenon lamp.

According to an embodiment, the display 201 may be exposed through a substantial portion of the front plate 202. In an example, an edge of the display 201 may be formed to be generally the same as an adjacent outer shape (e.g., a curved surface) of the front plate 202. In another embodiment, to expand an exposed area of the display 201, a distance between an outer edge of the display 201 and an outer edge of the front plate 202 may be formed to be generally the same as each other. In another embodiment, a recess or opening may be formed in a part of a screen display area of the display 201, and other electronic components, for example, the camera module 205 and/or a proximity sensor or illuminance sensor aligned with the recess or opening may be included.

In another embodiment, at least one or more of the camera modules 212, 213, 214, and 215, a fingerprint sensor, and a flash 206 may be included in a rear surface of the screen display area of the display 201. In another embodiment, the display 201 may be coupled to or be disposed adjacently to a touch sensing circuit, a pressure sensor capable of measuring an intensity (pressure) of a touch, and/or a digitizer detecting a stylus pen of a magnetic field type.

According to an embodiment, the audio module 203 may include a microphone hole and a speaker hole. A microphone for acquiring an external sound may be disposed in the microphone hole, and in some embodiment, a plurality of microphones may be disposed to detect the direction of a sound. In some embodiment, the speaker hole and the microphone hole may be implemented as a single hole, or a speaker (e.g., a piezo speaker) may be included without the speaker hole. The speaker hole may include an external speaker hole, and a receiver hole for a call.

By including the sensor module, the electronic device 200 may provide an electrical signal or data value corresponding to an internal operating state or an external environmental state. The sensor module may further include, for example, a proximity sensor disposed on the first surface 210A of the housing 210, a fingerprint sensor integrated into or disposed adjacent to the display 201, and/or a biometric sensor (e.g., an HRM sensor) disposed on the second surface 210B of the housing 210. The electronic device 200 may further include the sensor module, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, and an illuminance sensor.

According to an embodiment, the camera modules 205, 212, 213, 214, 215, and 206 may include a first camera device 205 disposed on the first surface 210A of the electronic device 200, a second camera device 212, 213, 214, or 215 disposed on the second surface 210B, and/or a flash 206. The aforementioned camera devices 205, 212, 213, 214, and 215 may include one or more lenses, an image sensor, and/or an image signal processor. The flash 206 may include, for example, a light emitting diode or a xenon lamp. In some embodiment, two or more lenses (infrared camera, wide angle and telephoto lens) and image sensors may be disposed on one surface of the electronic device 200.

According to an embodiment, the key input device 217 may be disposed on the side surface 210C of the housing 210. In another embodiment, the electronic device 200 may not include some or all of the above-mentioned key input devices 217, and the key input devices 217 not included may be implemented in another form such as a soft key, etc. on the display 201. In some embodiment, the key input device may include at least part of a fingerprint sensor disposed on the second surface 210B of the housing 210.

According to an embodiment, the connector hole 208 may accommodate a connector for transmitting/receiving power and/or data with an external electronic device, and/or a connector for transmitting/receiving an audio signal with the external electronic device. For example, the connector hole 208 may include a USB connector or an earphone jack (or an "earphone interface"). In an embodiment, the USB connector and the earphone jack may be implemented as a single hole as well, and in another embodiment, the electronic device 200 may transmit/receive power and/or data, or also transmit/receive an audio signal, with the external electronic device (e.g., the electronic devices 102 and 104 of FIG. 1), without a separate connector hole.

Figure 3:
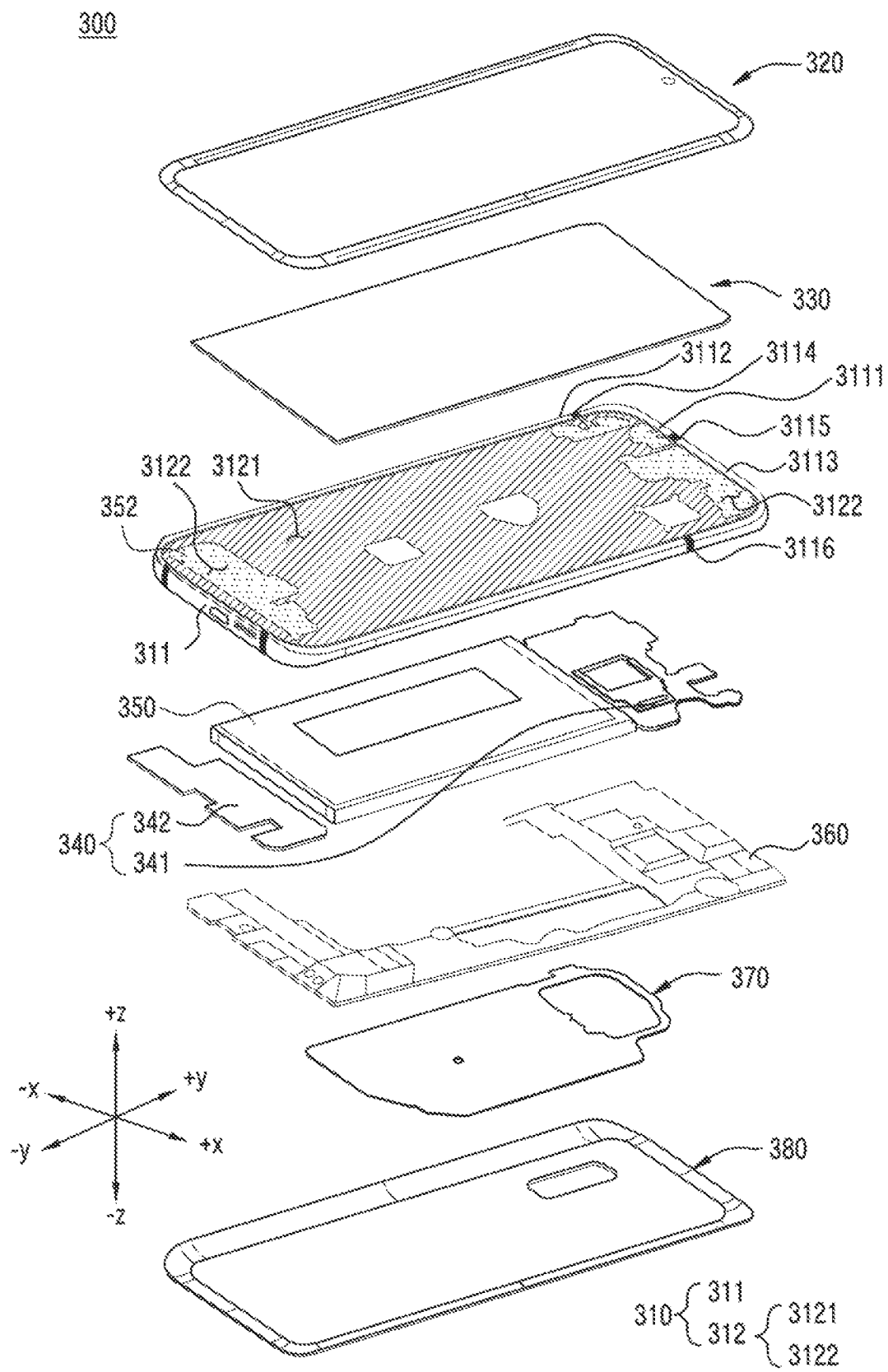
FIG. 3 is an exploded perspective view of an electronic device according to an embodiment.

FIG. 3 is an exploded perspective view of an electronic device 300 according to an embodiment.

Referring to FIG. 3, the electronic device 300 (e.g., the electronic device 101 of FIG. 1 or the electronic device 200 of FIG. 2A and FIG. 2B) of an embodiment may include a side member 310 (or a "bracket") (e.g., the side member 218 of FIG. 2A), a front plate 320 (e.g., the front plate 202 of FIG. 2A), a display panel 330 (e.g., the display 201 of FIG. 2A), at least one printed circuit board 340, a battery 350, a support member 360 (e.g., a rear case), an antenna 370, and/or a rear plate 380 (e.g., the rear plate 211 of FIG. 2B). The electronic device 300 of an embodiment may omit at least one (e.g., the support member 360) from the above-described components, or may additionally include other components. At least one of the components of the electronic device 300 of an embodiment may be the same as or similar to at least one of the components of the electronic device 200 of FIG. 2A and/or FIG. 2B, and a repeated description will be omitted below.

According to an embodiment, the side member 310 may include a first structure 311 forming a side surface (e.g., the side surface 210C of FIG. 2A) of the electronic device 300, and/or a second structure 312 presenting a space in which an electronic component (e.g., the printed circuit board 340) may be disposed.

In an example, the first structure 311 of the side member 310 may include a first conductive portion 3111 (e.g., the first conductive portion 2181 of FIG. 2A and FIG. 2B), a second conductive portion 3112 (e.g., the second conductive portion 2182 of FIG. 2A and FIG. 2B), a third conductive portion 3113 (e.g., the third conductive portion 2183 of FIG. 2A and FIG. 2B), a first non-conductive portion 3114 (e.g., the first non-conductive portion 2184 of FIG. 2A and FIG. 2B), a second non-conductive portion 3115 (e.g., the second non-conductive portion 2185 of FIG. 2A and FIG. 2B), and/or a third non-conductive portion 3116 (e.g., the third non-conductive portion 2186 of FIG. 2A and FIG. 2B). In an example, the first non-conductive portion 3114 may be located between the first conductive portion 3111 and the second conductive portion 3112, and the second non-conductive portion 3115 may be located between the first conductive portion 3111 and one end of the third conductive portion 3113, and the third non-conductive portion 3116 may be located at the other end of the third conductive portion 3113. By the above-described arrangement structure of the first non-conductive portion 3114, the second non-conductive portion 3115, and/or the third non-conductive portion 3116, the first conductive portion 3111, the second conductive portion 3112, and/or the third conductive portion 3113 may be insulated from each other. In an example, the first conductive portion 3111, the second conductive portion 3112, and/or the third conductive portion 3113 may be electrically connected to a wireless communication circuit (e.g., the communication module 190 of FIG. 1), and thus operate as an antenna radiator for transmitting and/or receiving an RF signal of a specified frequency band.

In an example, the second structure 312 of the side member 310 may be connected to the first structure 311 forming the side surface of the electronic device 300. For example, the second structure 312 may be located inside the first structure 311, to form a structure in which an outer circumferential surface of the second structure 312 is connected to the first structure 311. In another example, the first structure 311 and the second structure 312 may be integrally formed. In an example, the second structure 312 may include a conductive area 3121 and/or a non-conductive area 3122. In an example, the conductive area 3121 of the second structure 312 may be formed of a conductive material (e.g., a metal), and the non-conductive area 3122 of the second structure 312 may be formed of a polymer (e.g., polycarbonate). In another example, the non-conductive area 3122 of the second structure 312 may be formed by insert injection into an opening formed in at least one area of the conductive area 3121, but is not limited thereto. In an example, electronic components (e.g., the display panel 330 and/or the printed circuit board 340) of the electronic device 300 may be disposed in the conductive area 3121 and/or non-conductive area 3122 of the second structure 312. For example, the display panel 330 may be disposed on one surface (e.g., one surface of a +z direction of FIG. 3) of the second structure 312, and at least one printed circuit board 340 may be disposed on the other surface (e.g., one surface of a −z direction of FIG. 3) of the second structure 312.

According to an embodiment, the display panel 330 may be located between the front plate 320 and the second structure 312 of the side member 310. In an example, at least a partial area of the display panel 330 may be disposed in at least one area of the second structure 312, and be supported by the second structure 312. In an example, the display panel 330 may emit light from a pixel so as to forward information to a user, and the light emitted from the pixel may be forwarded to the outside of the electronic device 300 through the front plate 320.

According to an embodiment, a processor (e.g., the processor 120 of FIG. 1), a memory (e.g., the memory 130 of FIG. 1), and/or an interface (e.g., the interface 177 of FIG. 1) may be disposed in at least one printed circuit board 340. The processor may include, for example, one or more of a central processing unit, an application processor, a graphics processing unit, an image signal processor, a sensor hub processor, or a communication processor. The memory may include, for example, a volatile memory or a non-volatile memory. The interface may include, for example, a high definition multimedia interface (HDMI), a universal serial bus (USB) interface, an SD card interface, and/or an audio interface. The interface may, for example, electrically or physically connect the electronic device 300 to an external electronic device, and may include a USB connector, an SD card/MMC connector, or an audio connector. In an example, the at least one printed circuit board 340 may include a first printed circuit board 341 and a second printed circuit board 342 connected to the first printed circuit board 341 through a connector. However, the printed circuit board 340 of the present disclosure is not limited to the above-described embodiment, and the printed circuit board 340 of another embodiment may be formed of a single board as well. In an example, the at least one printed circuit board 340 may be disposed on the same plane as the battery 350, wherein the at least one printed circuit board 340 and the battery 350 may be arranged to avoid each other or overlap partially.

According to an embodiment, the battery 350 supplies power to at least one component of the electronic device 300, and may include, for example, a non-rechargeable primary cell, or a rechargeable secondary cell, or a fuel battery. At least a part of the battery 350 may be disposed on the substantially same plane as the at least one printed circuit board 340. The battery 350 may be integrally disposed inside the electronic device 300, and may be disposed to be displaceable with the electronic device 300 as well.

According to an embodiment, the antenna 370 may be disposed between the rear plate 380 and the battery 350. In an example, the antenna 370 may include a near field communication (NFC) antenna, a wireless charging antenna, and/or a magnetic secure transmission (MST) antenna. The antenna 370 may, for example, perform short-range communication with an external device, or wirelessly transmit/receive power required for charging.

In an embodiment, the rear plate 380 may form the rear surface (e.g., the second surface 210B of FIG. 2B) of the electronic device 300. The rear plate 380 may protect the electronic device 300 from external impact or foreign substances.

Figure 4:
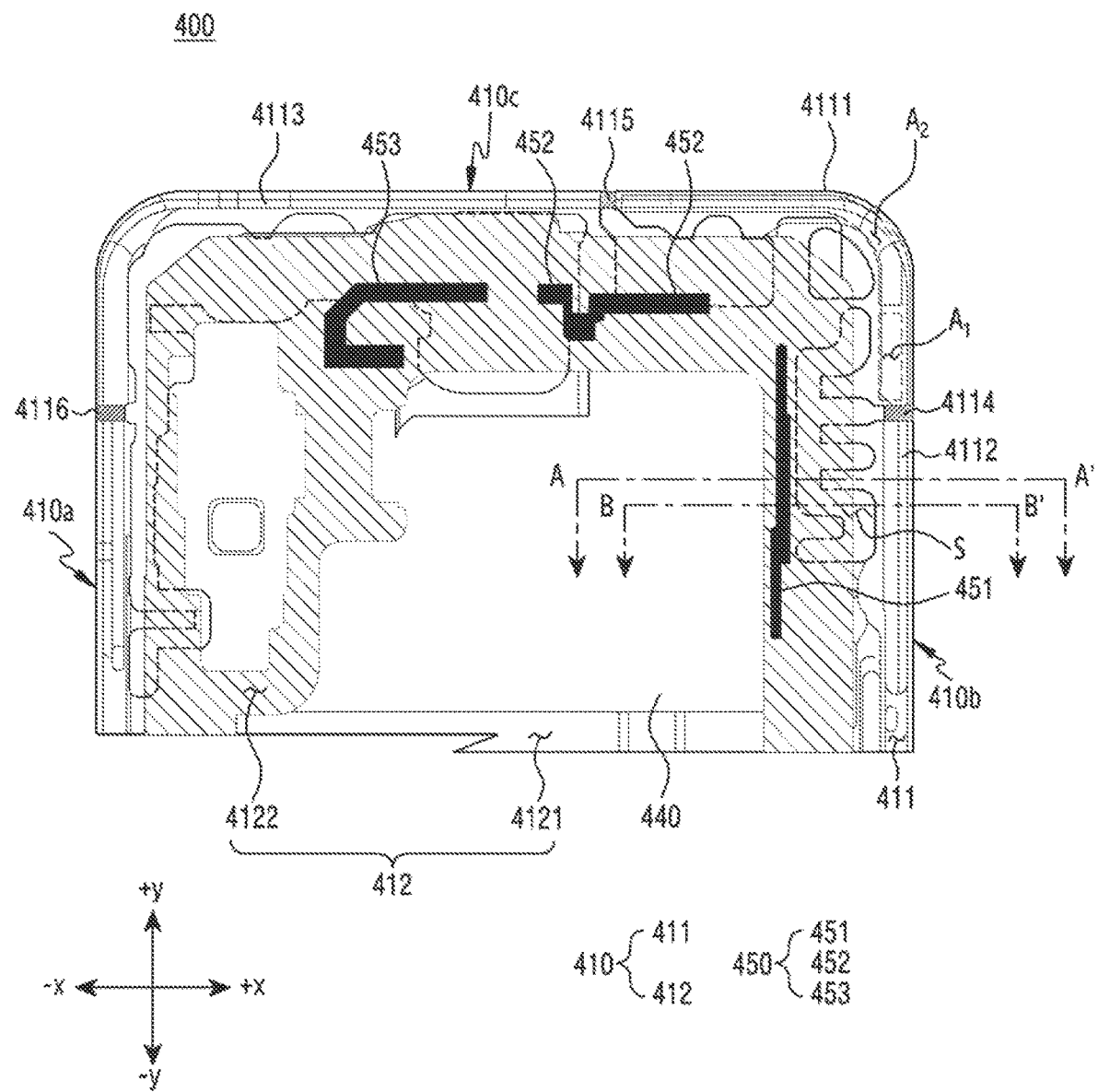
FIG. 4 is a diagram illustrating a partial area of a side member of an electronic device according to an embodiment.
Figure 5A:
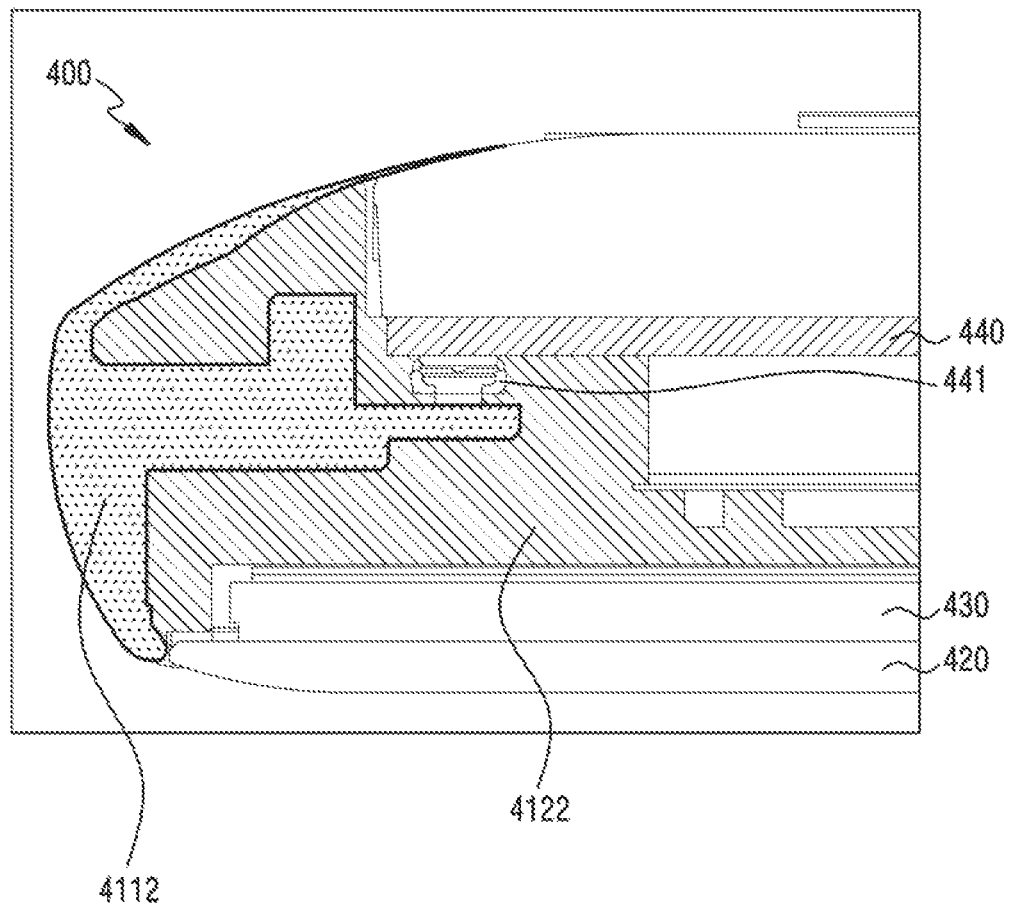
FIG. 5A is a cross-sectional view of the side member of FIG. 4 taken along line A-A'.
Figure 5B:
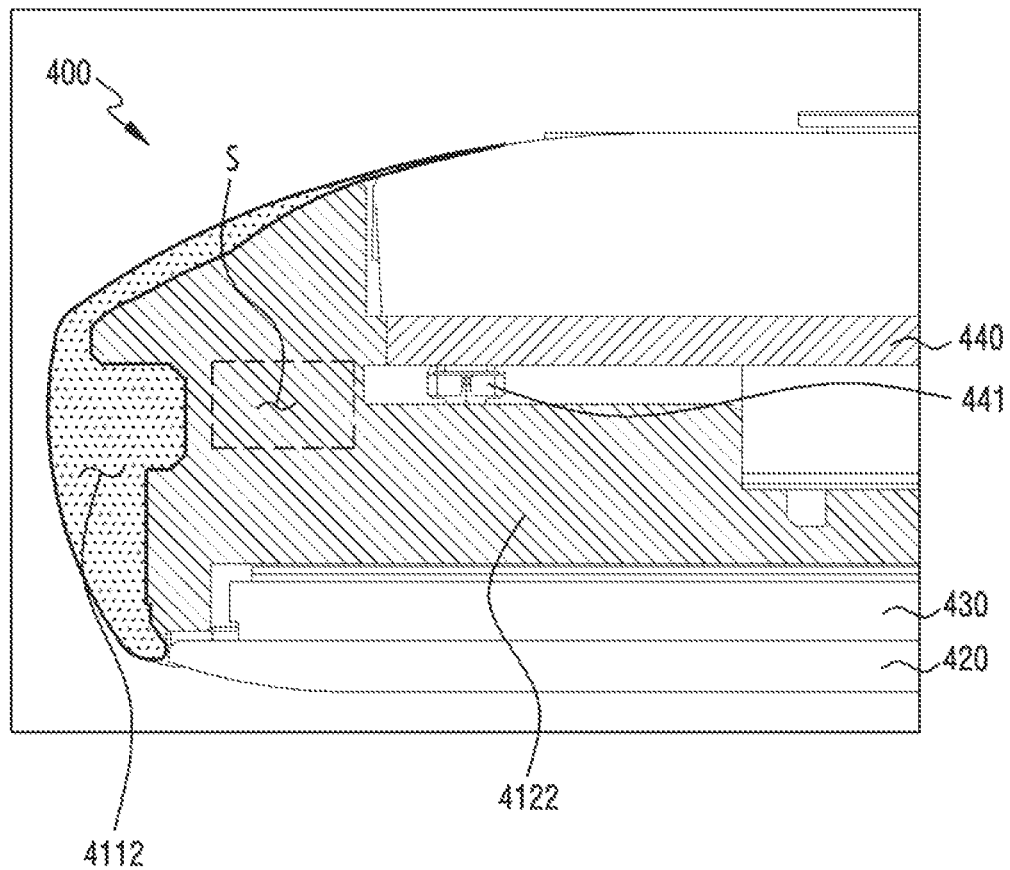
FIG. 5B is a cross-sectional view of the side member of FIG. 4 taken along line B-B'.

FIG. 4 is a diagram illustrating a partial area of a side member 410 of an electronic device 400 according to an embodiment, and FIG. 5A is a cross-sectional diagram of the side member of FIG. 4 taken along line A-A', and FIG. 5B is a cross-sectional diagram of the side member of FIG. 4 taken along line B-B'. FIG. 4 of the present disclosure is a diagram illustrating an upper area (e.g., an area of a +y direction of FIG. 3) of the side member 310 of FIG. 3 viewed in a −z direction (e.g., a −z direction of FIG. 3).

Referring to FIG. 4, FIG. 5A, and FIG. 5B, the electronic device 400 (e.g., the electronic device 200 of FIG. 2A and FIG. 2B or the electronic device 300 of FIG. 3) of an embodiment may include the side member 410 (e.g., the side member 310 of FIG. 3), a front plate 420 (e.g., the front plate 320 of FIG. 3), a display panel 430 (e.g., the display panel 330 of FIG. 3), a printed circuit board 440 (e.g., at least one printed circuit board 340 of FIG. 3), and/or at least one conductive pattern 450. At least one of the components of the electronic device 400 of an embodiment may be the same as or similar to at least one of the components of the electronic device 200 of FIG. 2A and FIG. 2B or the electronic device 300 of FIG. 3, and a repeated description will be omitted below.

According to an embodiment, the side member 410 may include a first structure 411 (e.g., the first structure 311 of FIG. 3) and/or a second structure 412 (e.g., the second structure 312 of FIG. 3).

In an example, the first structure 411 of the side member 410 may be formed of a conductive material (e.g., a metal), and may form at least a part of a side surface of the electronic device 400. In an example, the first structure 411 may form a first side surface 410a (e.g., the first side surface 2111 of FIG. 2A) extending along a first direction (e.g., a +y direction of FIG. 4), a second side surface 410b parallel to the first side surface 410a and extending along the first direction, a third side surface 410c (e.g., the third side surface 2113 of FIG. 2A) extending along a second direction (e.g., an +x direction of FIG. 4) perpendicular to the first direction, and connecting one end (e.g., one end of the +y direction of FIG. 4) of the first side surface 410a and one end (e.g., one end of the +y direction of FIG. 4) of the second side surface 410b, and/or a fourth side surface (e.g., the fourth side surface 2114 of FIG. 2A) parallel to the third side surface 410c, and connecting the other end (e.g., one end of a −y direction of FIG. 4) of the first side surface 410a and the other end (e.g., one end of the −y direction of FIG. 4) of the second side surface 410b.

According to an embodiment, the first structure 411 of the side member 410 may include a first conductive portion 4111 (e.g., the first conductive portion 3111 of FIG. 3), a second conductive portion 4112 (e.g., the second conductive portion 3112 of FIG. 3), a third conductive portion 4113 (e.g., the third conductive portion 3113 of FIG. 3), a first non-conductive portion 4114 (e.g., the first non-conductive portion 3114 of FIG. 3), a second non-conductive portion 4115 (e.g., the second non-conductive portion 3115 of FIG. 3), and/or a third non-conductive portion 4116 (e.g., the third non-conductive portion 3116 of FIG. 3). In an example, at least one area of the first conductive portion 4111 may be located on the second side surface 410b, and another area of the first conductive portion 4111 may be located in an area where the second side surface 410b and the third side surface 410c are connected, and a remaining area of the first conductive portion 4111 may be located on the third side surface 410c. For example, the first conductive portion 4111 may be formed to extend from at least one area of the second side surface 410b to at least one area of the third side surface 410c. In another example, the second conductive portion 4112 may be adjacent to one end (e.g., one end of a −y direction of FIG. 4) of the first conductive portion 4111, and be located on the second side surface 410b. In a further example, the third conductive portion 4113 may be located adjacent to the other end (e.g., one end of a −x direction of FIG. 4) of the first conductive portion 4111. For example, at least one area of the third conductive portion 4113 may be located on the first side surface 410a, and another area of the third conductive portion 4113 may be disposed in an area where the first side surface 410a and the third side surface 410c are connected, and a remaining area of the third conductive portion 4113 may be disposed on the third side surface 410c. For another example, the third conductive portion 4113 may be formed to extend from at least one area of the first side surface 410a to at least one area of the third side surface 410c. In an example, the first non-conductive portion 4114 may be located between the first conductive portion 4111 and the second conductive portion 4112. In another example, the second non-conductive portion 4115 may be located between the first conductive portion 4111 and one end (e.g., one end of the +x direction of FIG. 4) of the third conductive portion 4113. In a further example, the third non-conductive portion 4116 may be located on the other end (e.g., one end of the −y direction of FIG. 4) of the third conductive portion 4113.

In an example, the first conductive portion 4111, the second conductive portion 4112, and/or the third conductive portion 4113 may be insulated by the first non-conductive portion 4114, the second non-conductive portion 4115, and the third non-conductive portion 4116. In another example, the first conductive portion 4111, the second conductive portion 4112, and/or the third conductive portion 4113 may be electrically connected to a wireless communication circuit (e.g., the communication module 190 of FIG. 1) disposed on the printed circuit board 440 and/or the ground of the printed circuit board 440, and as a result, at least one conductive portion among the first conductive portion 4111, the second conductive portion 4112, or the third conductive portion 4113 may operate as an antenna radiator for transmitting and/or receiving an RF signal of a specified frequency band. In an example, the first conductive portion 4111, the second conductive portion 4112, and/or the third conductive portion 4113 may be electrically connected to the wireless communication circuit through an electrical connection member (e.g., 411 of FIG. 5A), and be fed from the wireless communication circuit. The above-described electrical connection member may be, for example, a signal wiring, a C-clip, a conductive foam, and/or a conductive gasket, but is not limited thereto.

In an example, the second structure 412 of the side member 410 may form an area in which components (e.g., electronic components) of the electronic device 400 may be disposed, and support the components disposed in the above-described area. In an example, the printed circuit board 440 may be disposed in at least one area of the side member 410, and the above-described printed circuit board 440 may be supported by the second structure 412 of the side member 410. In an example, the second structure 412 of the side member 410 may include a conductive area 4121 (e.g., the conductive area 3121 of FIG. 3) and/or a non-conductive area 4122 (e.g., the non-conductive area 3122 of FIG. 3). In an example, the conductive area 4121 may be formed of a conductive material (e.g., metal). In another example, the non-conductive area 4122 may be formed of a polymer (e.g., polycarbonate) having a non-conductive property. In an embodiment, when viewed in a −z-axis direction, at least a part of the non-conductive area 4122 may be at least partially overlapped with the conductive area 4121. In another example, the non-conductive area 4122 may be an antenna carrier.

According to an embodiment (e.g., referring to FIG. 5, FIG. 6A, and/or FIG. 6B), a slit (S) having a specified shape may be formed in at least one area of the conductive area 4121 of the second structure 412. In an example, the slit (S) may be formed in an area adjacent to the second conductive portion 4112 of the first structure 411 among the conductive area 4121 of the second structure 412.

According to an embodiment, a partial area (e.g., an area ($A_1$) of FIG. 4) of the first conductive portion 4111 may be fed from the wireless communication circuit and operate as an antenna radiator for transmitting and/or receiving an RF signal of a first frequency band. The first frequency band may be, for example, a frequency band of about 2.2 GHz to about 2.7 GHz and/or a frequency band (or "WiFi frequency band") of about 5.1 GHz to about 5.8 GHz, but is not limited thereto. In another example, an area (e.g., an area ($A_2$) of FIG. 4) different from the above-described partial area of the first conductive portion 4111 may operate as an antenna radiator for transmitting and/or receiving an RF signal of a third frequency band. The third frequency band may be, for example, a frequency band of about 1.5 GHz to about 2.7 GHz, but is not limited thereto.

According to an embodiment, the slit (S) located in the area adjacent to the second conductive portion 4112 may operate as an antenna for transmitting and/or receiving an RF signal of a second frequency band. In an example, the second conductive portion 4112 adjacent to the slit (S) may be electrically connected to the wireless communication circuit. Accordingly, the wireless communication circuit may feed the RF signal of the second frequency band to the second conductive portion 4112, and the above-described slit (S) may operate as a slit antenna through the RF signal of the second frequency band fed to the second conductive portion 4112. In an example (e.g., referring to FIG. 5A), the second conductive portion 4112 may be electrically connected to the wireless communication circuit disposed on the printed circuit board 440 through an electrical connection member 441 that is located between a partial area of the second conductive portion 4112 and the printed circuit board 440. In another example, the wireless communication circuit may transmit or feed the RF signal of the second frequency band to the second conductive portion 4112 through the electrical connection member 441. The above-described electrical connection member 441 may include, for example, at least one of a C-clip, a conductive gasket, a conductive foam, and a signal wiring, but is not limited thereto. The electronic device 400 may transmit and/or receive the RF signal of the second frequency band by using the slit (S) adjacent to the second conductive portion 4112. In an example, the second frequency band may be partially overlapped with the first frequency band described above, or may be the same frequency band. For example, the second frequency band may be a frequency band of about 2.2 GHz to about 2.7 GHz, but is not limited thereto. In another example, the second frequency band may be a frequency band different from the first frequency band described above. For example, the first frequency band may be a frequency band of about 2.2 GHz to about 2.7 GHz and/or a frequency band of about 5.1 GHz to about 5.8 GHz, and the second frequency band may be a frequency band of about 3 GHz (e.g., about 3.3 GHz to about 3.5 GHz) different from the first frequency band described above.

According to an embodiment, the third conductive portion 4113 may be fed from the wireless communication circuit and operate as an antenna radiator for transmitting and/or receiving an RF signal of a fourth frequency band. The fourth frequency band may be, for example, a frequency band of about 0.7 GHz to about 1 GHz, but is not limited thereto.

According to an embodiment, the at least one conductive pattern 450 may be disposed in the non-conductive area 4122 of the second structure 412. In an example, the at least one conductive pattern 450 may include a first conductive pattern 451, a second conductive pattern 452 disposed to be spaced apart from the first conductive pattern 451, and/or a third conductive pattern 453 disposed to be spaced apart from the first conductive pattern 451 and the second conductive pattern 452. In another example, the first conductive pattern 451, the second conductive pattern 452, and/or the third conductive pattern 453 are disposed to be spaced apart from each other in the non-conductive area 4122, whereby the first conductive pattern 451, the second conductive pattern 452 and/or the third conductive pattern 453 may be insulated from each other. In an example, the first conductive pattern 451 may be disposed in an area adjacent to the second conductive portion 4112 among the non-conductive area 4122. In another example, the second conductive pattern 452 and/or the third conductive pattern 453 may be disposed in an area adjacent to the first conductive portion 4111 and/or the third conductive portion 4113. In an example, the first conductive pattern 451, the second conductive pattern 452, and/or the third conductive pattern 453 may be formed in a manner of drawing a pattern on the non-conductive area 4122 by a laser and then patterning a conductive material (e.g., metal), but is not limited thereto. For example, the first conductive pattern 451, the second conductive pattern 452, and/or the third conductive pattern 453 may be a laser direct structuring (LDS) pattern.

According to an embodiment, the first conductive pattern 451, the second conductive pattern 452, and/or the third conductive pattern 453 may be electrically connected to the wireless communication circuit through an electrical connection member (e.g., a C-clip, a conductive gasket, a conductive foam, and/or a signal wiring). In an example, the first conductive pattern 451 may be fed from the wireless communication circuit and operate as an antenna radiator for transmitting and/or receiving an RF signal of a fifth frequency band. The fifth frequency band may be, for example, a frequency band of about 5.1 GHz to about 5.8 GHz, but is not limited thereto. In another example, the second conductive pattern 452 and/or the third conductive pattern 453 may be fed from the wireless communication circuit and operate as an antenna radiator for transmitting and/or receiving an RF signal of a sixth frequency band. The sixth frequency band may be, for example, a frequency band of about 3.3 GHz to about 3.8 GHz, but is not limited thereto. However, the second conductive pattern 452 and/or the third conductive pattern 453 are not limited to the above-described embodiment, and according to another embodiment, the second conductive pattern 452 and the third conductive pattern 453 may operate as antenna radiators for transmitting and/or receiving RF signals of different frequency bands as well.

According to an embodiment, the electronic device 400 may transmit and/or receive an RF signal of a first frequency band (e.g., a frequency band of about 2.2 GHz to about 2.7 GHz and/or a frequency band of about 5.1 GHz to about 5.8 GHz) or a third frequency band (a frequency band of about 1.5 GHz to about 2.7 GHz) through the first conductive portion 4111. In an example, the electronic device 400 may transmit and/or receive an RF signal of a second frequency band (e.g., a frequency band of about 2.2 GHz to about 2.7 GHz) through the slit (S) located in an area adjacent to the second conductive portion 4112. In another example, the electronic device 400 may transmit and/or receive an RF signal of a fourth frequency band (e.g., a frequency band of about 1.5 GHz to about 2.7 GHz) through the third conductive portion 4113. In a further example, the electronic device 400 may transmit and/or receive an RF signal of a fifth frequency band (e.g., a frequency band of about 5.1 GHz to about 5.8 GHz) through the first conductive pattern 451. The electronic device 400 may transmit and/or receive an RF signal of a sixth frequency band (e.g., a frequency band of about 3.3 GHz to about 3.8 GHz) through the second conductive pattern 452 and/or the third conductive pattern 453.

According to an embodiment, the slit (S) adjacent to the first conductive portion 4111 and/or the second conductive portion 4112 of the electronic device 400 may operate as a multiple input and multiple output (MIMO) antenna of a frequency band (or a "WiFi frequency band") of about 2.2 GHz to about 2.7 GHz. Below, an electrical connection relationship between the first conductive portion 4111 and/or second conductive portion 4112 and the wireless communication circuit, for operating the first conductive portion 4111 and/or the slit (S) as MIMO antennas will be described with reference to FIG. 6, FIG. 7, and/or FIG. 8.

Figure 6:
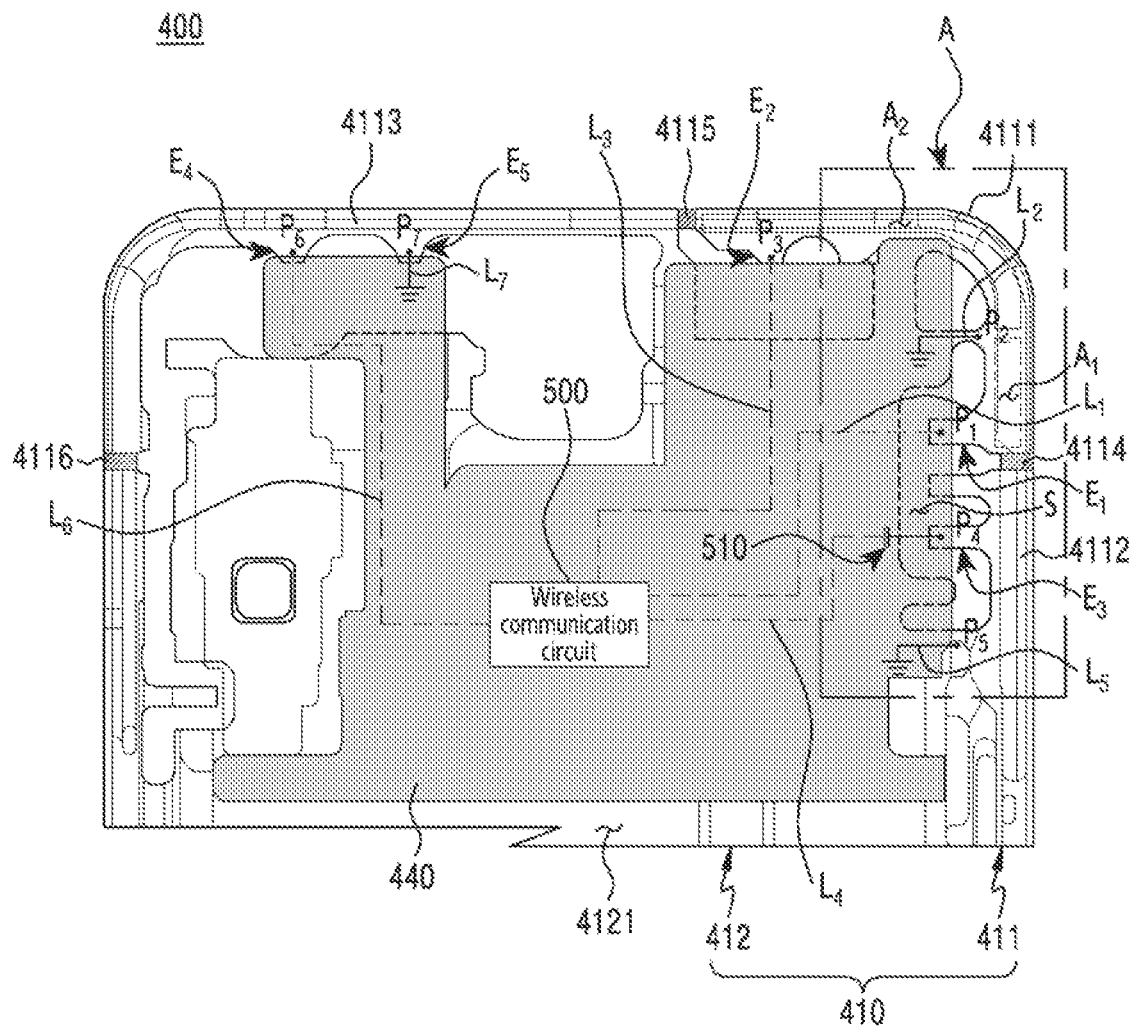
FIG. 6 is a diagram illustrating a state in which a partial construction is removed from the side member of FIG. 4.
Figure 7:
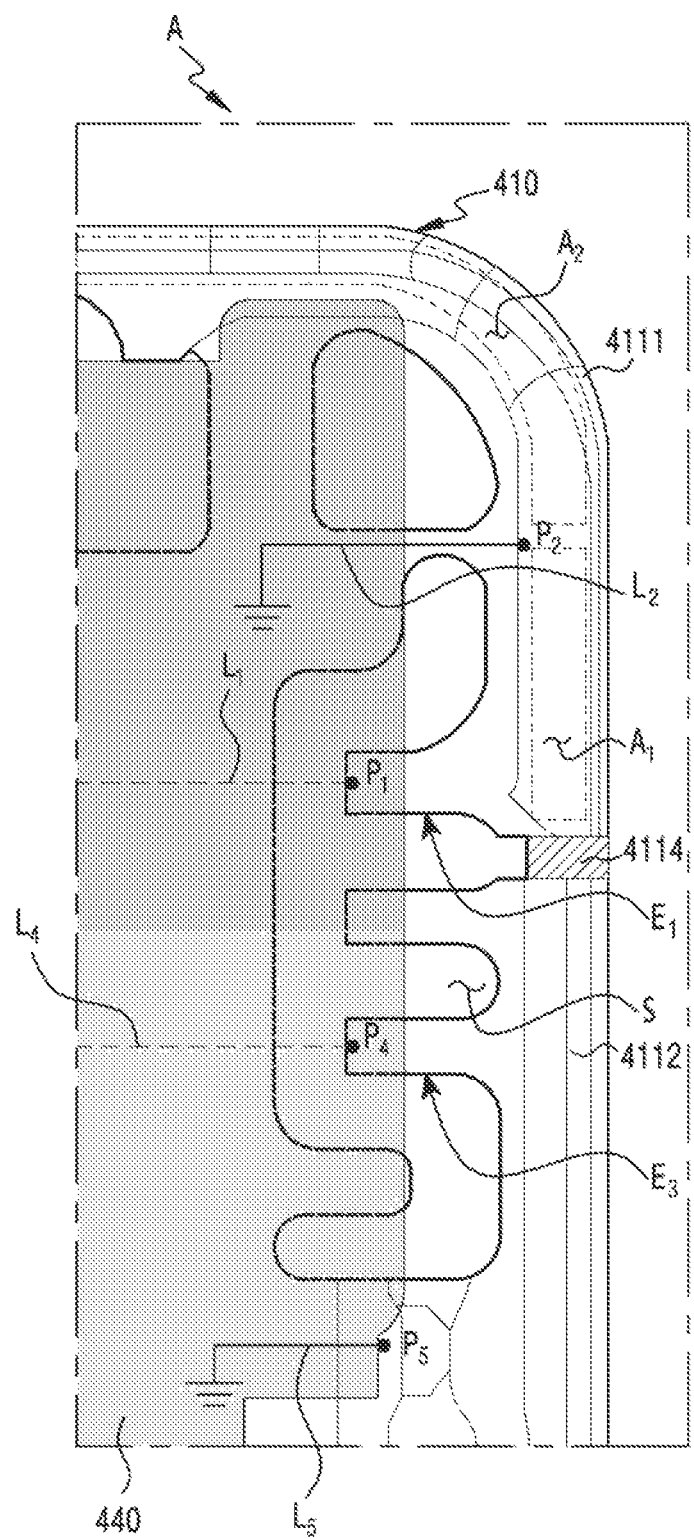
FIG. 7 is an enlarged view illustrating an enlarged area (A) of the side member of FIG. 6 according to an embodiment.
Figure 8:
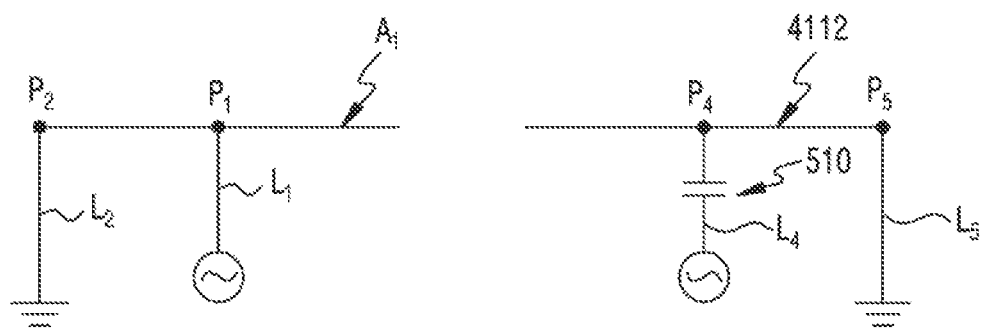
FIG. 8 is a diagram illustrating equivalent circuits of a first area of a first conductive portion and a second conductive portion according to an embodiment.

FIG. 6 is a diagram illustrating a state in which some components (e.g., the non-conductive area 4122 of FIG. 4) are removed from the side member 410 of FIG. 4, and FIG. 7 is an enlarged diagram illustrating an area (A) of the side member 410 of FIG. 6 according to an embodiment, and FIG. 8 is a diagram illustrating equivalent circuits of a first area ($A_1$) of the first conductive portion 4111 and the second conductive portion 4112 according to an embodiment.

Referring to FIGS. 6, 7, and 8, the electronic device 400 (e.g., the electronic device 300 of FIG. 3 or the electronic device 400 of FIG. 4) of an embodiment may include a side member 410 (e.g., the side member 410 of FIG. 4), a printed circuit board 440 (e.g., the printed circuit board 440 of FIG. 4), and/or a wireless communication circuit 500 (e.g., the communication module 190 of FIG. 1). At least one of the components of the electronic device 400 of an embodiment may be the same as or similar to at least one of the components of the electronic device 400 of FIG. 4, FIG. 5A and/or FIG. 5B, and a repeated description will be omitted below.

According to an embodiment, the side member 410 may include a first structure 411 (e.g., the first structure 411 of FIG. 4) forming a side surface of the electronic device 400 and/or a second structure 412 (e.g., the second structure 412 of FIG. 4) in which components (e.g., the printed circuit board 440) of the electronic device 400 may be disposed.

In an example, the first structure 411 of the side member 410 may include a first conductive portion 4111 (e.g., the first conductive portion 4111 of FIG. 4), a second conductive portion 4112 (e.g., the second conductive portion 4112 of FIG. 4), a third conductive portion 4113 (e.g., the third conductive portion 4113 of FIG. 4), a first non-conductive portion 4114 (e.g., the first non-conductive portion 4114 of FIG. 4), a second non-conductive portion 4115 (e.g., the second non-conductive portion 4115 of FIG. 4), and/or a third non-conductive portion 4116 (e.g., the third non-conductive portion 4116 of FIG. 4).

In an example, the second structure 412 of the side member 410 may include a conductive area 4121 and/or a non-conductive area (e.g., the non-conductive area 4122 of FIG. 4). In an example, a printed circuit board 440 may be disposed in at least one area of the second structure 412, and the printed circuit board 440 may be supported by the second structure 412. In another example, a slit (S) (e.g., an S area of FIG. 4, FIG. 5A, and FIG. 5B) may be formed in an area adjacent to the second conductive portion 4112 of the first structure 411 among the conductive area 4121 of the second structure 412.

According to an embodiment, the printed circuit board 440 may be disposed in at least one area of the conductive area 4121 of the side member 410, and may include the ground. In an example, the wireless communication circuit 500 may be disposed in at least one area of the printed circuit board 440. In an embodiment, the aforementioned wireless communication circuit 500 may be electrically connected to the first conductive portion 4111, the second conductive portion 4112, and/or the third conductive portion 4113. For example, the wireless communication circuit 500 may be electrically connected to the first conductive portion 4111, the second conductive portion 4112, and/or the third conductive portion 4113 through an electrical connection member (e.g., a signal wiring, a C-clip, a conductive gasket, and/or a conductive foam). In an example, the wireless communication circuit 500 may support a wireless fidelity protocol. For example, the wireless communication circuit 500 may transmit an RF signal of a WiFi frequency band (e.g., a frequency band of about 2.2 GHz to about 2.7 GHz and/or a frequency band of about 5.1 GHz to about 5.8 GHz) to at least one conductive portion among the first conductive portion 4111, the second conductive portion 4112, or the third conductive portion 4113. In another example, the wireless communication circuit 500 may receive an RF signal of a WiFi frequency band from at least one conductive portion among the first conductive portion 4111, the second conductive portion 4112, or the third conductive portion 4113.

According to an embodiment, the first conductive portion 4111, the second conductive portion 4112, and/or the third conductive portion 4113 are electrically connected to the wireless communication circuit 500, and are grounded to the ground of the printed circuit board 440, whereby at least one conductive portion among the first conductive portion 4111, the second conductive portion 4112, or the third conductive portion 4113 may operate as an antenna radiator for transmitting and/or receiving an RF signal of a specified frequency band.

According to an embodiment, the first conductive portion 4111 may include a first area ($A_1$) adjacent to the second conductive portion 4112 and a second area ($A_2$) adjacent to the third conductive portion 4113.

In an example, the first area ($A_1$) of the first conductive portion 4111 may be electrically connected to the wireless communication circuit 500 at a first point ($P_1$), and a first electrical path ($L_1$) may be formed between the first area ($A_1$) of the first conductive portion 4111 and the wireless communication circuit 500. In another example, a second point ($P_2$) located between the first area ($A_1$) and the second area ($A_2$) of the first conductive portion 4111 may be electrically connected to the ground of the printed circuit board 440. Accordingly, a second electrical path ($L_2$) may be formed between the first area ($A_1$) and/or second area ($A_2$) of the first conductive portion 4111 and the ground of the printed circuit board 440. In an example, the first area ($A_1$) of the first conductive portion 4111 may be electrically connected to the wireless communication circuit 500 and/or the ground of the printed circuit board 440 through an electrical connection member (e.g., a signal wiring, a C-clip, a conductive gasket, and/or a conductive foam). In another example, the first point ($P_1$) of the first area ($A_1$) may be located in an area adjacent to the first non-conductive portion 4114, and the second point ($P_2$) of the first area ($A_1$) may be disposed to be spaced apart farther than the first point ($P_1$) with a criterion of the first non-conductive portion 4114. Through the above-described electrical connection relationship, the first area ($A_1$) of the first conductive portion 4111 may be electrically connected to the wireless communication circuit 500 through the first electrical path ($L_1$), and may be grounded to the ground of the printed circuit board 440 through the second electrical path ($L_2$).

In an example, the wireless communication circuit 500 may feed an RF signal of a first frequency band to the first area ($A_1$) of the first conductive portion 4111 through the first electrical path ($L_1$). For example, the first area ($A_1$) of the first conductive portion 4111 may operate as an antenna radiator for transmitting and/or receiving the RF signal of the first frequency band. The first frequency band may be, for example, a frequency band of about 2.2 GHz to about 2.7 GHz and/or a frequency band of about 5.1 GHz to about 5.8 GHz, but is not limited thereto.

In an example, the second area ($A_2$) of the first conductive portion 4111 may be electrically connected to the wireless communication circuit 500 at a third point ($P_3$). For example, a third electrical path ($L_3$) may be formed between the second area ($A_2$) of the first conductive portion 4111 and the wireless communication circuit 500. In an example, the second area ($A_2$) of the first conductive portion 4111 may be electrically connected to the wireless communication circuit 500 through an electrical connection member (e.g., a signal wiring, a C-clip, a conductive gasket, and/or a conductive foam). The second area ($A_2$) of the first conductive portion 4111 may be electrically connected to the ground of the printed circuit board 440 through the second electrical path ($L_2$) described above. Through the above-described electrical connection relationship, the second area ($A_2$) of the first conductive portion 4111 may be grounded to the ground of the printed circuit board 440 through the second electrical path ($L_2$), and may be fed from the wireless communication circuit 500 through the third electrical path ($L_3$).

In an example, the wireless communication circuit 500 may feed an RF signal of a third frequency band to the second area ($A_2$) of the first conductive portion 4111 through the third electrical path ($L_3$). In another example, the second area ($A_2$) of the first conductive portion 4111 may be formed to have a relatively longer length than the first area ($A_1$) of the first conductive portion 4111. Accordingly, the second area ($A_2$) may operate as an antenna radiator for transmitting and/or receiving an RF signal of a frequency band relatively lower than that of the first area ($A_1$). In an example, the second area ($A_2$) of the first conductive portion 4111 may operate as an antenna radiator for transmitting and/or receiving an RF signal of a third frequency band lower than the first frequency band. The third frequency band may be, for example, a frequency band of about 1.5 GHz to about 2.7 GHz, but is not limited thereto.

According to an embodiment, the first conductive portion 4111 may include at least one protrusion ($E_1$ and/or $E_2$) (or a "flange") protruding toward the printed circuit board 440 at the first point ($P_1$) and/or the third point ($P_3$). In an example, the at least one protrusion may include a first protrusion ($E_1$) protruding toward the printed circuit board 440 at the first point ($P_1$), and/or a second protrusion ($E_2$) protruding toward the printed circuit board 440 at the third point ($P_3$). In an example, as an electrical connection member (e.g., a signal wiring, an FPCB, a conductive gasket, and/or a conductive foam) electrically connected to the wireless communication circuit 500 comes in contact with the first protrusion ($E_1$) and/or second protrusion ($E_2$) of the first conductive portion 4111, the first conductive portion 4111 may be electrically connected to the wireless communication circuit 500.

In an example, the first conductive portion 4111 may be electrically connected to the ground of the printed circuit board 440, by directly contacting with the printed circuit board 440 at the second point ($P_2$). In another example, the first conductive portion 4111 may further include a protrusion protruding toward the printed circuit board 440 at the second point ($P_2$). In another example, the first conductive portion 4111 may come in contact with the above-described protrusion, and may also be electrically connected to the ground of the printed circuit board 440 through an electrical connection member that is electrically connected to the ground of the printed circuit board 440.

According to an embodiment, a slit (S) may be formed in an area adjacent to the second conductive portion 4112 among the conductive area 4121 of the side member 410. In an example, as an RF signal of a specified frequency band is fed from the wireless communication circuit 500 to the second conductive portion 4112, the slit (S) adjacent to the second conductive portion 4112 may operate as an antenna.

In an example, the second conductive portion 4112 may be electrically connected to the wireless communication circuit 500 at a fourth point ($P_4$). For example, a fourth electrical path ($L_4$) may be formed between the fourth point ($P_4$) of the second conductive portion 4112 and the wireless communication circuit 500. In another example, the second conductive portion 4112 may be electrically connected to the ground of the printed circuit board 440 at a fifth point ($P_5$) spaced apart from the fourth point ($P_4$). For example, a fifth electrical path ($L_5$) may be formed between the fifth point ($P_5$) of the second conductive portion 4112 and the ground of the printed circuit board 440. In an example, the fifth point ($P_5$) may be disposed to be spaced apart farther than the fourth point ($P_4$) with a criterion to the first nonconductive portion 4114.

Referring to FIGS. 6, 7, and 8, in an example, a capacitor 510 may be disposed on the fourth electrical path ($L_4$). In an example, the second conductive portion 4112 may be fed indirectly from the wireless communication circuit 500 through the capacitor 510 disposed on the fourth electrical path ($L_4$). The capacitor 510 may be, for example, a series capacitor of about 3.0 pF or less, but is not limited thereto. In another example, the second conductive portion 4112 may be grounded to the ground of the printed circuit board 440 through the fifth electrical path ($L_5$). In an example, the wireless communication circuit 500 may indirectly feed an RF signal of a second frequency band to the second conductive portion 4112. In an example, as the second conductive portion 4112 is indirectly fed from the wireless communication circuit 500, the slit (S) disposed in an area adjacent to the second conductive portion 4112 may operate as an antenna (e.g., a slit antenna) for transmitting and/or receiving an RF signal of a second frequency band. In an example, the second frequency band may be a frequency band of about 2.2 GHz to about 2.7 GHz (or "WiFi frequency band"), but is not limited thereto.

In an example, the second frequency band (e.g., a frequency band of about 2.2 GHz to about 2.7 GHz) may be an area at least partially overlapped with the first frequency band (e.g., a frequency band of about 2.2 GHz to about 2.7 GHz and/or a frequency band of about 5.1 GHz to about 5.8 GHz). The electronic device 400 of an embodiment may use the first area ($A_1$) of the above-described first conductive portion 4111 and/or the slit (S), as a MIMO antenna of a frequency band of about 2.2 GHz to about 2.7 GHz (or "WiFi frequency band").

In an example, the first area ($A_1$) of the first conductive portion 4111 and the slit (S) may be located in an adjacent area, and operate as an antenna for transmitting and/or receiving RF signals of frequency bands at least partially overlapping. Accordingly, interference may occur between an RF signal of a first frequency band radiated from the first area ($A_1$) of the first conductive portion 4111 and an RF signal of a second frequency band radiated from the slit (S).

According to an embodiment, the electronic device 400 may indirectly feed power to the second conductive portion 4112, thereby reducing the interference between the RF signal radiated from the first area ($A_1$) of the first conductive portion 4111 and the RF signal radiated from the slit (S).

TABLE 1

| Feeding scheme | Directly feeding power to second conductive portion | Indirectly feeding power to second conductive portion |
|---|---|---|
| $S_{21}$ | −6 to −8 (dB) | −9 to −10 (dB) |

Table 1 is data obtained by measuring a transmittance coefficient (or "$S_{21}$") between the slit (S) and one area ($A_1$) of the first conductive portion 4111 when an RF signal is directly fed to the second conductive portion 4112 and when the RF signal is indirectly fed to the second conductive portion 4112. As the transmission coefficient is decreased, isolation (or an "isolation degree") between the first area ($A_1$) of the first conductive portion 4111 operating as the antenna radiator and the slit (S) may be improved. Referring to Table 1, in an example, when the second conductive portion 4112 is directly fed from the wireless communication circuit 500 through the fourth electrical path ($L_4$), the transmission coefficient (or "$S_{21}$") between the slit (S) and the first area ($A_1$) of the first conductive portion 4111 may be about −6 to −8 dB. In another example, when the second conductive portion 4112 is indirectly fed from the wireless communication circuit 500 through the capacitor 510, the transmittance coefficient (or "$S_{21}$") between the slit (S) and the first area ($A_1$) of the first conductive portion 4111 may be about −9 to −10 dB. The electronic device 400 of an embodiment may reduce interference between an RF signal radiated from the slit (S) and an RF signal radiated from the first area ($A_1$) of the first conductive portion 4111, by indirectly feeding power to the second conductive portion 4112 through the capacitor 510, compared to when directly feeding power to the second conductive portion 4112.

According to an embodiment, the second conductive portion 4112 may include a third protrusion ($E_3$) (or a "flange") protruding toward the printed circuit board 440 at the fourth point ($P_4$). In an example, as an electrical connection member (e.g., a signal wiring, an FPCB, a conductive gasket, and/or a conductive foam) electrically connected to the wireless communication circuit 500 comes in contact with the third protrusion ($E_3$) of the second conductive portion 4112, the second conductive portion 4112 may be electrically connected to the wireless communication circuit 500. In another example, the second conductive portion 4112 may further include a protrusion protruding toward the printed circuit board 440 at the fifth point ($P_5$).

According to an embodiment, the third conductive portion 4113 may be electrically connected to the wireless communication circuit 500 at a sixth point ($P_6$). In another example, the third conductive portion 4113 may be electrically connected to the ground of the printed circuit board 440 at a seventh point ($P_7$) spaced apart from the sixth point ($P_6$). In an example, a sixth electrical path ($L_6$) may be formed between the sixth point ($P_6$) of the third conductive portion 4113 and the wireless communication circuit 500, and a seventh electrical path ($L_7$) may be formed between the seventh point ($P_7$) of the third conductive portion 4113 and the ground of the printed circuit board 440. In an example, the third conductive portion 4113 may be electrically connected to the wireless communication circuit 500 and/or the ground of the printed circuit board 440 through an electrical connection member (e.g., a signal wiring, a C-clip, a conductive gasket, and/or a conductive foam). Through the above-described electrical connection relationship, the third conductive portion 4113 may be electrically connected to the wireless communication circuit 500 through the sixth electrical path ($L_6$), and be grounded to the ground of the printed circuit board 440 through the seventh electrical path ($L_7$). Accordingly, the third conductive portion 4113 may operate as an antenna radiator for transmitting and/or receiving an RF signal of a fourth frequency band. The fourth frequency band may be, for example, a frequency band of about 0.7 GHz to about 1 GHz, but is not limited thereto.

According to an embodiment, the third conductive portion 4113 may include the fourth protrusion ($E_4$) (or "flange") protruding toward the printed circuit board 440 at the sixth point ($P_6$) and/or a fifth protrusion ($E_5$) protruding toward the printed circuit board 440 at the seventh point ($P_7$). In an example, as an electrical connection member (e.g., a signal wiring, an FPCB, a conductive gasket, and/or a conductive foam) electrically connected to the wireless communication circuit 500 comes in contact with the fourth protrusion ($E_4$) of the third conductive portion 4113, the third conductive portion 4113 may be electrically connected to the wireless communication circuit 500. In another example, as an electrical connection member electrically connected to the ground of the printed circuit board 440 comes in contact with the fifth protrusion ($E_5$) of the third conductive portion 4113, the third conductive portion 4113 may be electrically connected to the ground of the printed circuit board 440. In a further example, the third conductive portion 4113 may come in contact with the printed circuit board 440 without the fifth protrusion ($E_5$), thereby electrically connecting to the ground of the printed circuit board 440 as well.

Figure 9A:
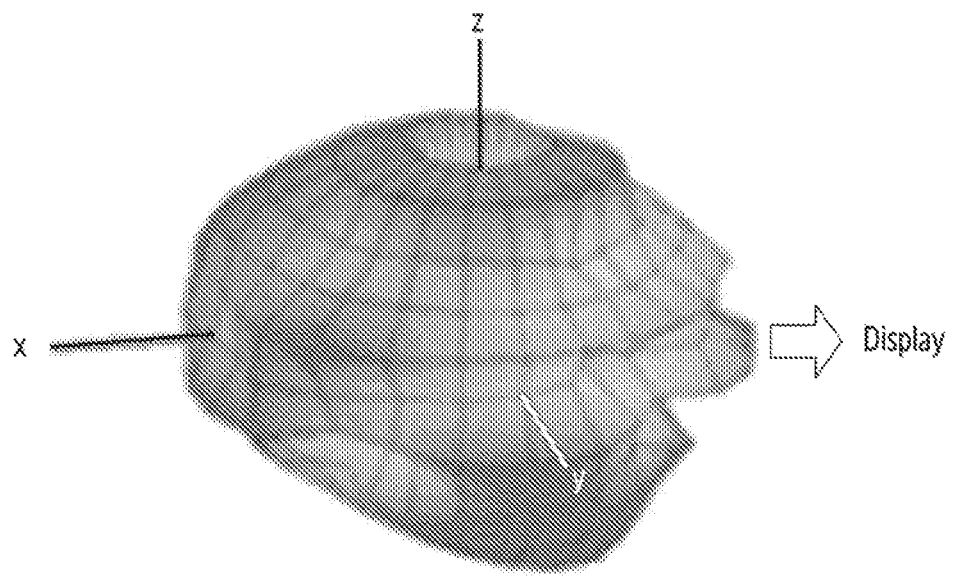
FIG. 9A is a diagram illustrating a beam pattern radiated from a slit of an electronic device according to an embodiment.
Figure 9B:
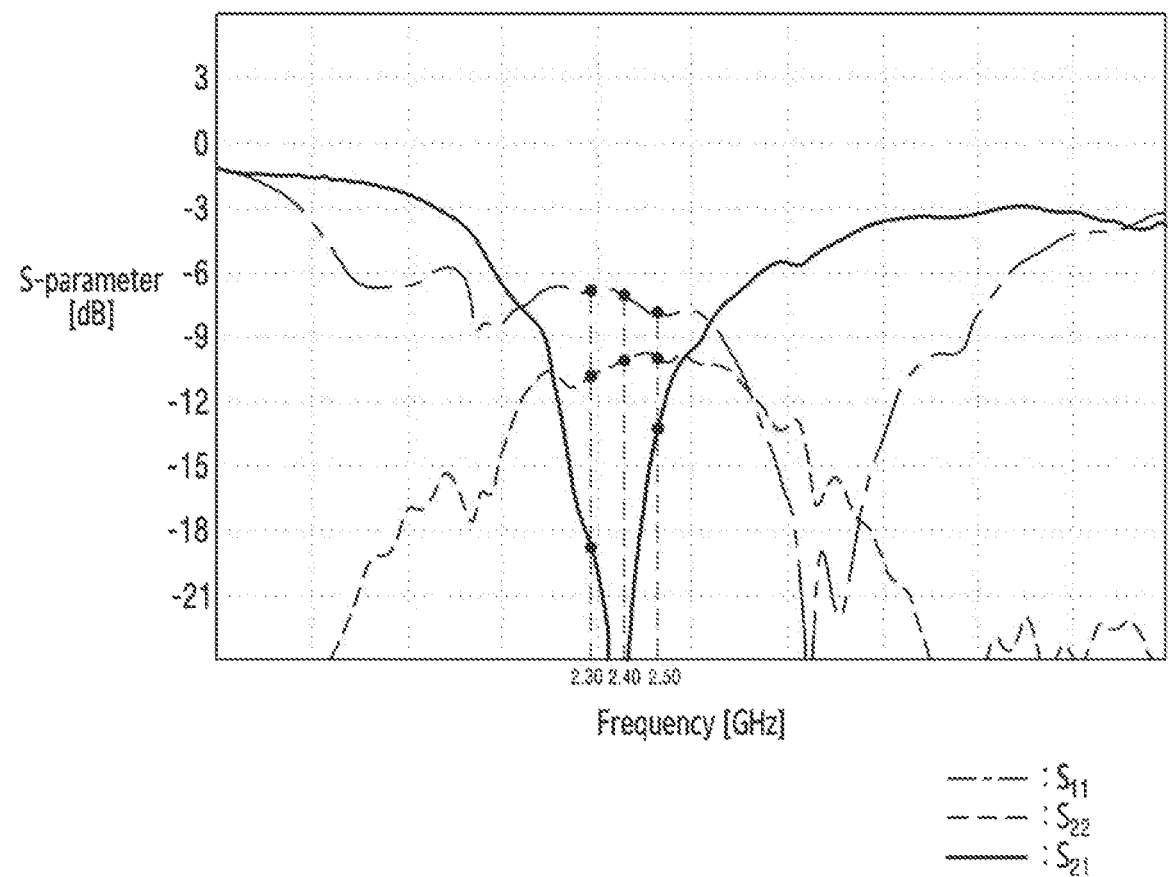
FIG. 9B is a graph illustrating an S-parameter of an electronic device according to an embodiment.
Figure 9C:
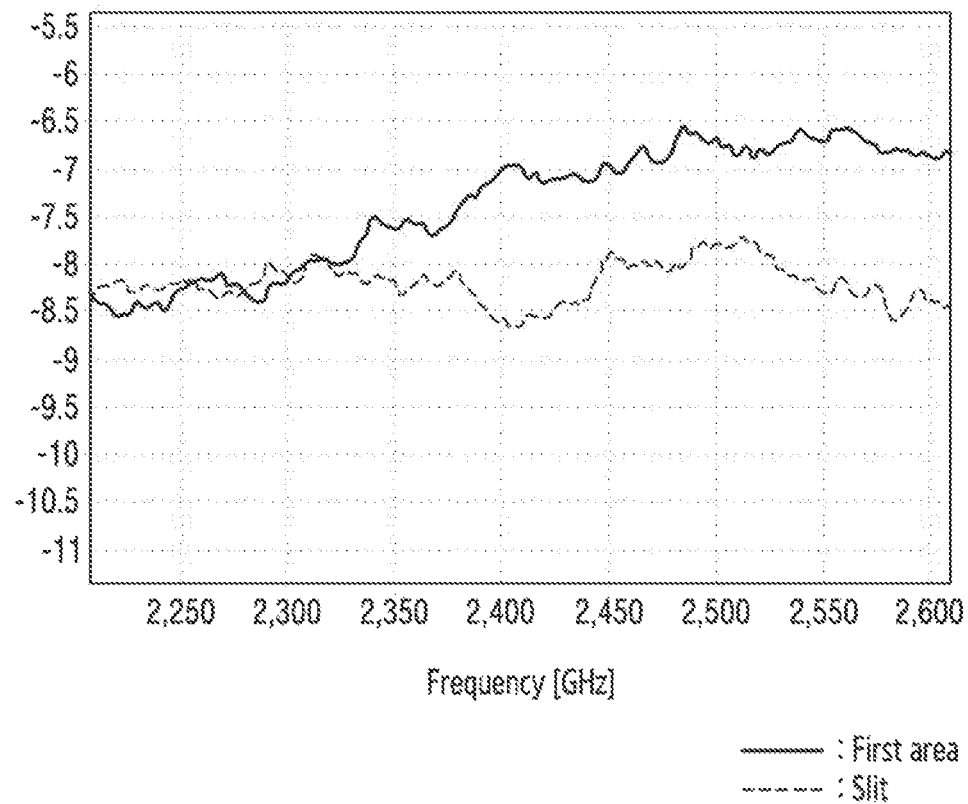
FIG. 9C is a graph illustrating an antenna gain of an electronic device according to an embodiment.

FIG. 9A is a diagram illustrating a beam pattern radiated from a slit of an electronic device according to an embodiment, and FIG. 9B is a graph illustrating an S-parameter of the electronic device according to an embodiment, and FIG. 9C is a graph illustrating an antenna gain of the electronic device according to an embodiment.

In the graph of FIG. 9B, a dotted line indicates a reflection coefficient (or "S ii") of a first antenna including a first area (e.g., the first area ($A_1$) of FIG. 7) of a first conductive portion (e.g., the first conductive portion 4111 of FIG. 7), and a dashed line indicates a reflection coefficient (or "$S_{22}$") of a second antenna including a slit (e.g., the slit (S) area of FIG. 7), and a solid line indicates a transmission coefficient (or "$S_{21}$") between the first antenna the second antenna. In the graph of FIG. 9c, a solid line indicates an antenna gain of the first antenna including the first area of the first conductive portion, and the dotted line indicates an antenna gain of the second antenna including the slit.

Referring to FIG. 9A, the electronic device (e.g., the electronic device 400 of FIG. 4) of an embodiment uses a slit formed in an area adjacent to a side surface of the electronic device as an antenna radiator, whereby a beam pattern of a display direction may be formed. For example, the electronic device of an embodiment may secure a beam pattern of a display direction through the slit disposed in a position spaced apart from a display panel (e.g., the display panel 430 of FIG. 5A). For example, as the electronic device uses as the antenna radiator a conductive portion (e.g., the second conductive portion 4112 of FIG. 4) included in a side member (e.g., the side member 410 of FIG. 4) disposed to be relatively much spaced apart from the ground included in the display panel (e.g., the display panel 430 of FIG. 5A), an opening surface of the antenna radiator may be expanded. Through the above-described arrangement structure, the radiation performance of a display panel direction of the electronic device may be improved. The electronic device of an embodiment forms the slit, and uses the slit as an antenna, antenna performance (e.g., directivity) may be improved compared to when using a laser direct structuring (LDS) pattern located inside the electronic device as an antenna radiator.

Referring to FIGS. 9B and 9C, in an example, it may be seen that a first antenna including a first area (e.g., $A_1$ of FIG. 7) of a first conductive portion (e.g., the first conductive portion 4111 of FIG. 7) and a second antenna including a slit (e.g., S of FIG. 7) have a coefficient of restitution of about −10 dB in a frequency band of about 2.1 GHz to about 2.7 GHz. In another example, the first antenna may have an antenna gain of about −6.6 dB in a frequency band of about 2.4 GHz, and the second antenna may have an antenna gain of about −8.2 dB in the frequency band of about 2.4 GHz. In an example, the electronic device may have a total antenna gain of about −4.4 dB in the frequency band of about 2.4 GHz. Through the above results, it may be confirmed that the first antenna including the first conductive portion and/or the second antenna including the slit of the electronic device of an embodiment may operate as antennas for transmitting and/or receiving an RF signal of the frequency band of about 2.1 GHz to about 2.7 GHz.

In another example, it may be confirmed that the first antenna and/or the second antenna have a transmission coefficient of about −9 dB to about −10 dB in the frequency band of about 2.1 GHz to about 2.7 GHz. When the transmission coefficient between the two adjacent antennas is −9 dB to −10 dB or less, because isolation between antenna radiators may be secured, it may be seen that the isolation between the first antenna including the first area of the first conductive portion and the second antenna including the slit is secured in the frequency band of about 2.1 GHz to about 2.7 GHz.

Figure 10:
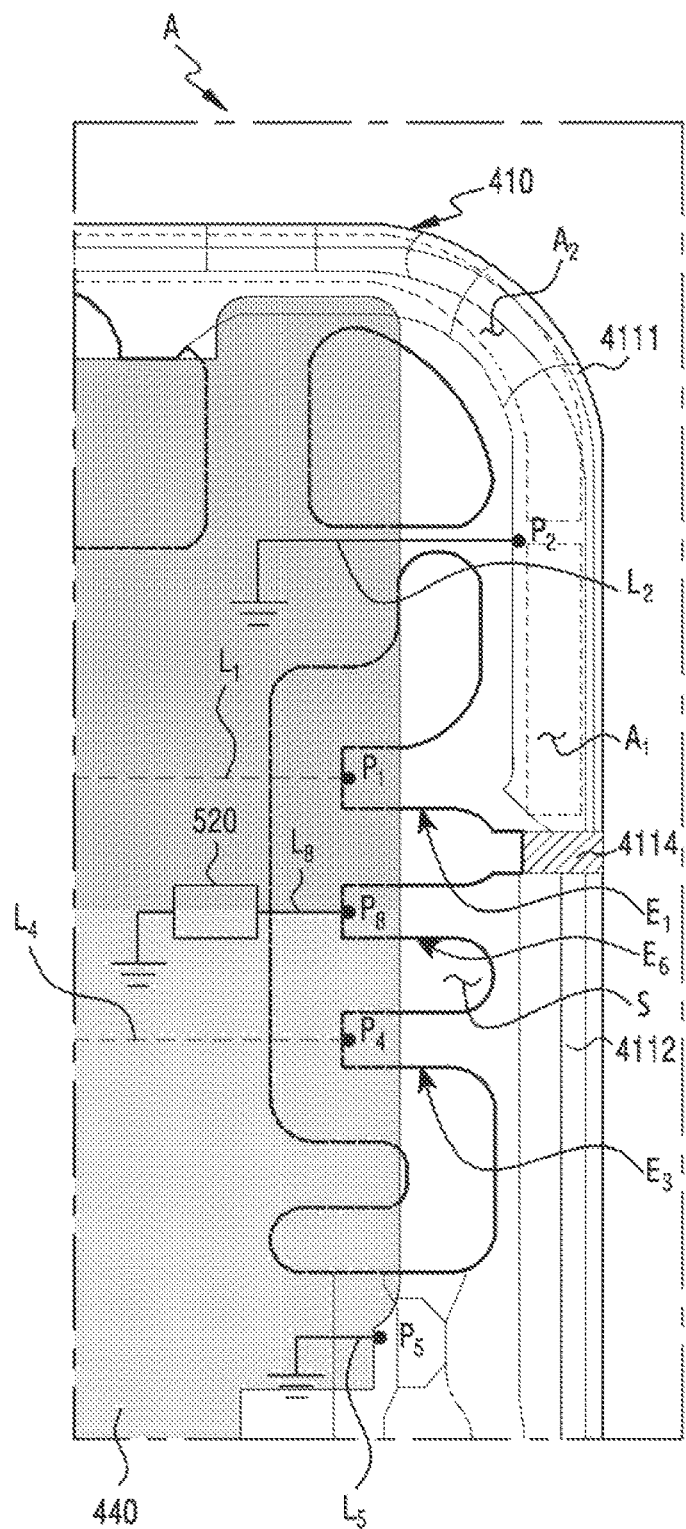
FIG. 10 is an enlarged view illustrating an enlarged area (A) of the side member of FIG. 6 according to another embodiment.
Figure 11:
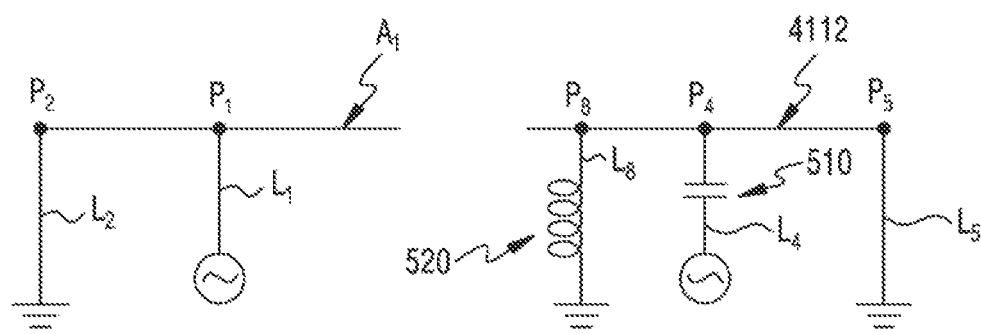
FIG. 11 is a diagram illustrating equivalent circuits of a first area of a first conductive portion and a second conductive portion according to another embodiment.

FIG. 10 is an enlarged diagram illustrating an area (A) of the side member 410 of FIG. 5 according to another embodiment, and FIG. 11 is a diagram illustrating equivalent circuits of the first area ($A_1$) of the first conductive portion 4111 and the second conductive portion 4112 according to another embodiment.

Referring to FIGS. 10 and 11, the electronic device 400 of an embodiment may be an electronic device adding an eighth electrical path ($L_8$) and/or a passive element 520 to the electronic device 400 of FIG. 7 and FIG. 8. At least one of the components of the electronic device 400 of an embodiment may be the same as or similar to at least one of the components of the electronic device 400 of FIG. 7 and/or FIG. 8, and a repeated description will be omitted below.

According to an embodiment, the second conductive portion 4112 (e.g., the second conductive portion 4112 of FIG. 7 and FIG. 8) may be electrically connected to the ground of a printed circuit board 440 (e.g., the printed circuit board 440 of FIG. 7 and FIG. 8) at an eighth point ($P_8$). For example, the eighth electrical path ($L_8$) may be formed between the eighth point ($P_8$) of the second conductive portion 4112 and the ground of the printed circuit board 440. In an example, the eighth point ($P_8$) may be located in an area adjacent to a first non-conductive portion 4114. In another example, the eighth point ($P_8$) may be located between the first non-conductive portion 4114 and a fourth point ($P_4$). In an example, the second conductive portion 4112 may be electrically connected to the ground of the printed circuit board 440 through an electrical connection member (e.g., a signal wiring, an FPCB, a conductive gasket, and/or a conductive foam). In an example, the second conductive portion 4112 may include a sixth protrusion ($E_6$) formed to protrude toward the printed circuit board 440 at the eighth point ($P_8$). In another example, as the above-described electrical connection member electrically connected to the ground of the printed circuit board 440 comes in contact with the eighth point ($P_8$) of the second conductive portion 4112, the second conductive portion 4112 may be grounded to the ground of the printed circuit board 440. In a further example, the printed circuit board 440 may include a PCB ground line that protrudes from the printed circuit board 440 toward the eighth point ($P_8$) of the second conductive portion 4112 and connects to the ground of the printed circuit board 440. In a yet another example, the second conductive portion 4112 may be electrically connected to the PCB ground line at the eighth point ($P_8$), thereby being grounded to the ground of the printed circuit board 440.

In an example, the passive element 520 may be disposed on the eighth electrical path ($L_8$). Accordingly, the electronic device 400 of an embodiment may be grounded to the ground of the printed circuit board 440 through the passive element 520 at the eighth point ($P_8$). The passive element 520 may be, for example, at least one of an inductor and a capacitor, but is not limited thereto.

According to an embodiment, the electronic device 400 may form the eighth electrical path ($L_8$) between a first antenna including the first area ($A_1$) of the first conductive portion 4111 (e.g., the first conductive portion 4111 of FIG. 7 and FIG. 8) for transmitting and/or receiving an RF signal of a first frequency band (e.g., a frequency band of about 2.2 GHz to about 2.7 GHz and/or a frequency band of about 5.1 GHz to about 5.8 GHz) and a second antenna including a slit (S) (e.g., the slit (S) of FIG. 7 and FIG. 8) for transmitting and/or receiving an RF signal of a second frequency band (e.g., a frequency band of about 2.2 GHz to about 2.7 GHz) that is at least partially overlapped with the first frequency band, and may dispose the passive element 520 on the eighth electrical path ($L_8$).

In an example, the electronic device 400 may reduce interference between an RF signal radiated from the first antenna including the first area ($A_1$) of the first conductive portion 4111 and an RF signal radiated from the second antenna including the slit (S), through the above-described eighth electrical path ($L_8$) and/or the passive element 520 disposed on the eighth electrical path ($L_8$). In another example, the electronic device 400 may also adjust (or "tune") the second antenna including a slit (S) area, through the above-described eighth electrical path ($L_8$) and/or the passive element 520 disposed on the eighth electrical path ($L_8$).

Figure 12A:
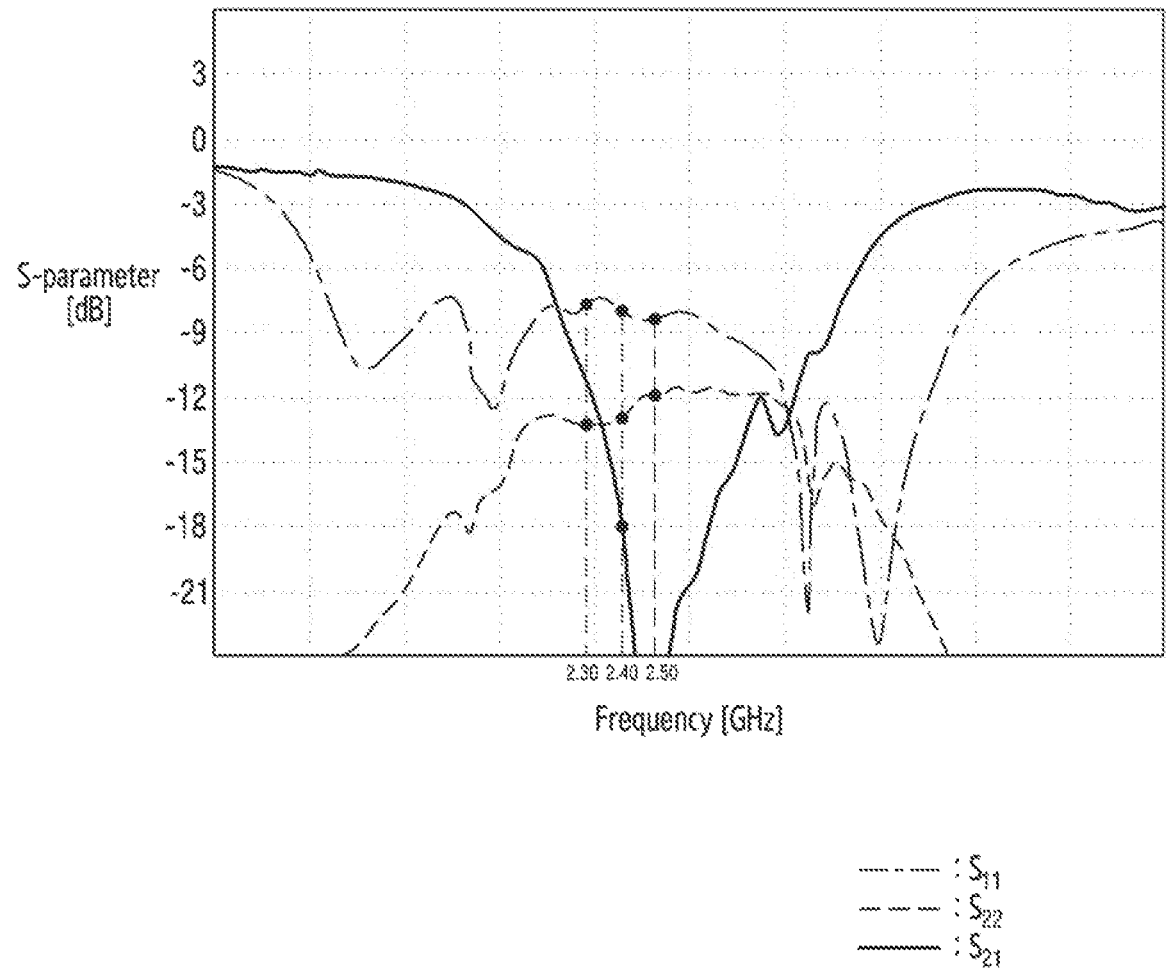
FIG. 12A is a graph illustrating an S-parameter of an electronic device according to an embodiment.
Figure 12B:
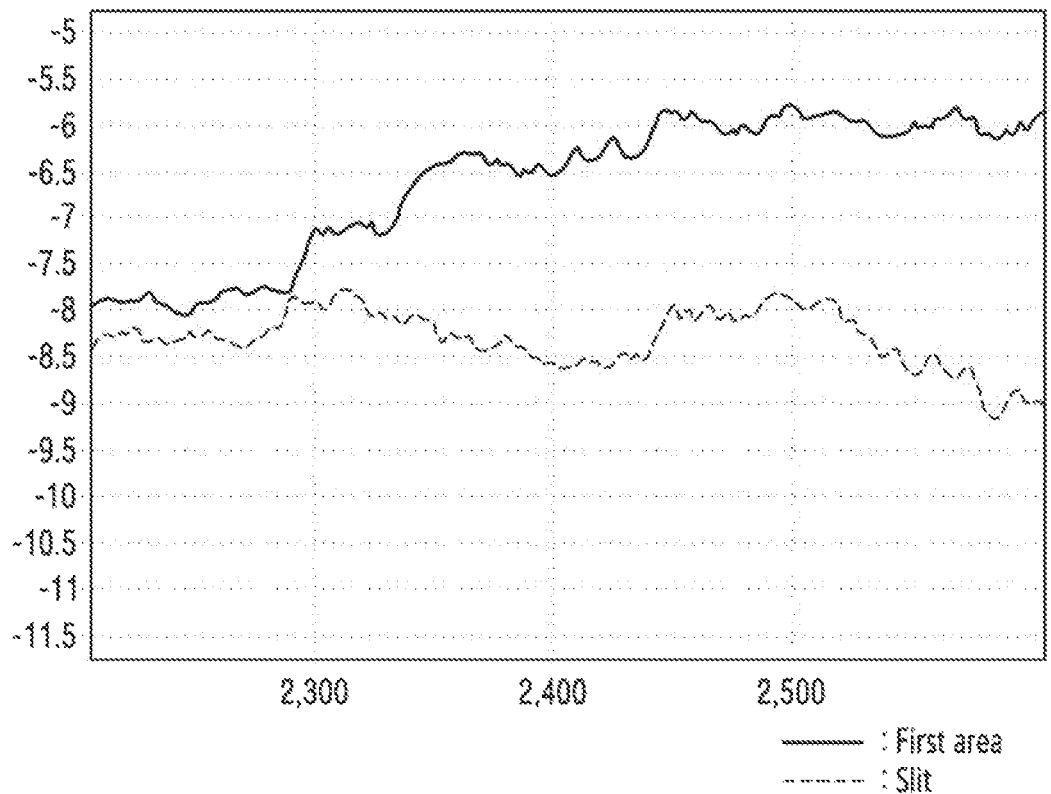
FIG. 12B is a graph illustrating an antenna gain of an electronic device according to an embodiment.

FIG. 12A is a graph illustrating an S-parameter of an electronic device according to an embodiment, and FIG. 12B is a graph illustrating an antenna gain of the electronic device according to an embodiment.

In the graph of FIG. 12A, a dotted line indicates a reflection coefficient (or "S11") of a first antenna including a first area (e.g., the first area ($A_1$) of FIG. 10) of a first conductive portion (e.g., the first conductive portion 4111 of FIG. 10), and a dashed-dotted line indicates a reflection coefficient (or "S22") of a second antenna including a slit (e.g., the slit (S) area of FIG. 10), and a solid line indicates a transmission coefficient (or "$S_{21}$") between the first antenna and the second antenna. In the graph of FIG. 12B, a solid line indicates an antenna gain of the first antenna including the first area of the first conductive portion, and a dotted line indicates an antenna gain of the second antenna including the slit.

Referring to FIG. 12A and FIG. 12B, in an example, it may be seen that the first antenna including the first area of the first conductive portion and the second antenna including the slit have a coefficient of restitution of about −10 dB in a frequency band of about 2.1 GHz to about 2.7 GHz. In another example, the first antenna may have an antenna gain of about −6.1 dB in a frequency band of about 2.4 GHz, and the second antenna may have an antenna gain of about −8.3 dB in the frequency band of about 2.4 GHz. In an example, the electronic device may have a total antenna gain of about −4.0 dB in the frequency band of about 2.4 GHz. Through the above result, it may be confirmed that the first antenna including the first conductive portion and/or the second antenna including the slit of the electronic device of an embodiment may operate as antennas for transmitting and/or receiving an RF signal of the frequency band of about 2.1 GHz to about 2.7 GHz.

In an example, it may be confirmed that the first antenna including the first area of the first conductive portion and/or the second antenna including the slit have a transmission coefficient of about −12 dB to about −13 dB in the frequency band of about 2.1 GHz to about 2.7 GHz. Referring to FIG. 9B and FIG. 12A above, it may be seen that, when a passive element (e.g., the passive element 520 of FIG. 11) is not disposed between the first antenna including the first area of the first conductive portion and the second antenna including the slit, a transmission coefficient is about −9 dB to about −10 dB in a frequency band of about 2.1 GHz to about 2.7 GHz, while when the passive element (e.g., the passive element 520 of FIG. 11) is disposed between the first antenna and the second antenna, the transmission coefficient between the first antenna and the second antenna is lowered to about −12 dB to about −13 dB. Through the above result, it may be seen that the passive element electrically connected to the ground of the printed circuit board is disposed between the first antenna including the first area of the first conductive portion and the second antenna including the slit, whereby the isolation between the first antenna and the second antenna is improved.

Figure 13:
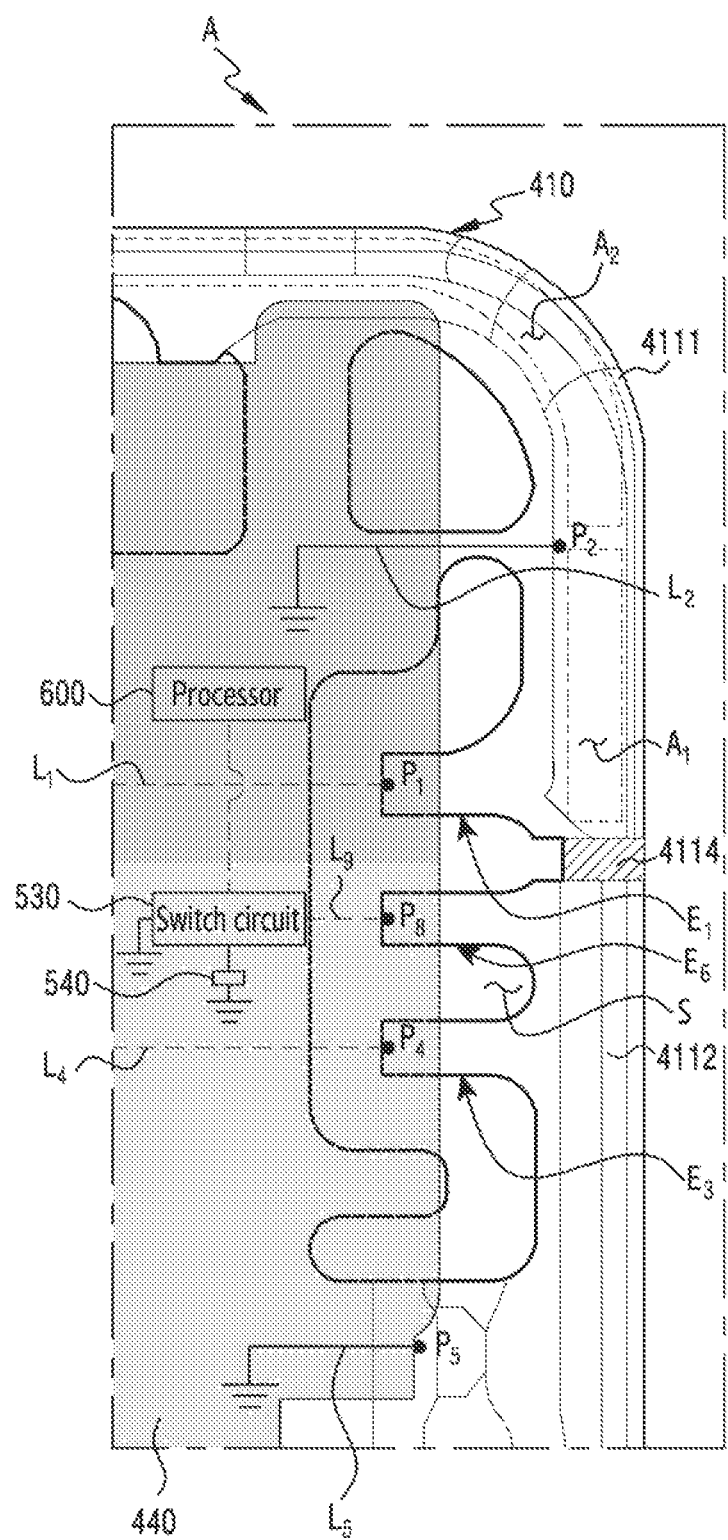
FIG. 13 is an enlarged view illustrating an enlarged area (A) of the side member of FIG. 6 according to a further embodiment.
Figure 14:
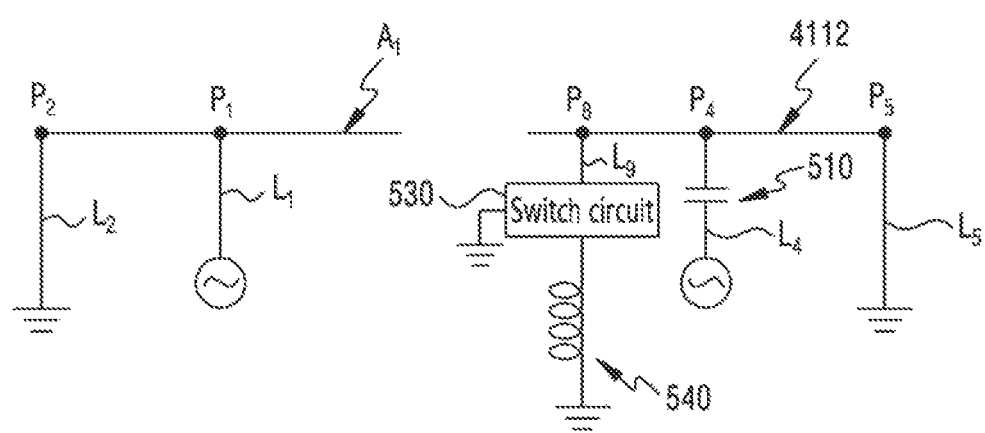
FIG. 14 is a diagram illustrating equivalent circuits of a first area of a first conductive portion and a second conductive portion according to a further embodiment.

FIG. 13 is an enlarged view illustrating an area (A) of the side member of FIG. 5 according to another embodiment, and FIG. 14 is equivalent circuits of a first conductive portion and a second conductive portion according to another embodiment.

Referring to FIGS. 13 and 14, the electronic device 400 of an embodiment may be an electronic device adding an eighth electrical path ($L_8$), a switch circuit 530, a passive element 540 and/or a processor 600 (e.g., the processor 120 of FIG. 1) to the electronic device 400 of FIG. 7 and FIG. 8. At least one of the components of the electronic device 400 of an embodiment may be the same as or similar to at least one of the components of the electronic device 400 of FIG. 7 and/or FIG. 8, and a repeated description will be omitted below.

According to an embodiment, the second conductive portion 4112 (e.g., the second conductive portion 4112 of FIG. 7 and FIG. 8) may be electrically connected to the switch circuit 530 at the eighth point ($P_8$). For example, a ninth electrical path ($L_9$) may be formed between the eighth point ($P_8$) of the second conductive portion 4112 and the switch circuit 530. In an example, the eighth point ($P_8$) may be located in an area adjacent to a first non-conductive portion 4114. In another example, the eighth point ($P_8$) may be located between the first non-conductive portion 4114 and a fourth point ($P_4$). In an example, the second conductive portion 4112 may be electrically connected to the switch circuit 530 through an electrical connection member (e.g., a signal wiring), but is not limited thereto. In an example, the second conductive portion 4112 may include a sixth protrusion ($E_6$) formed to protrude toward the printed circuit board 440 at the eighth point ($P_8$). In another example, as the above-described electrical connection member electrically connected to the switch circuit 530 comes in contact with the eighth point ($P_8$) of the second conductive portion 4112, the second conductive portion 4112 and the switch circuit 530 may be electrically connected with each other. In an example, the second conductive portion 4112 may be optionally connected to the ground of the printed circuit board 440 or the passive element 540 (e.g., an inductor and/or a capacitor) according to an electrical connection state of the switch circuit 530. In an example, when the switch circuit 530 is in a first electrical connection state, the second conductive portion 4112 may be electrically connected to the ground of the printed circuit board 440. In another example, when the switch circuit 530 is in a second electrical connection state, the second conductive portion 4112 may be electrically connected to the ground of the printed circuit board 440 through the passive element 540.

According to an embodiment, the processor 600 may be located on the printed circuit board 440 and may be electrically connected to the switch circuit 530. In an example, the processor 600 may change the electrical connection state of the switch circuit 530 according to a frequency band of an RF signal radiated from a first antenna including a first area ($A_1$) of the first conductive portion 4111 and/or a second antenna including a slit (S). In an example, the processor 600 may change the electrical connection state of the switch circuit 530 into the first electrical connection state, thereby reducing interference between an RF signal radiated from the first antenna including the first area ($A_1$) of the first conductive portion 4111 and an RF signal radiated from the second antenna including the slit (S). In another example, the processor 600 may change the electrical connection state of the switch circuit 530 into the second electrical connection state, thereby adjusting a resonance frequency of the RF signal radiated from the second antenna including the slit (S). According to another embodiment, the switch circuit 530 may be electrically connected to a wireless communication circuit (e.g., the wireless communication circuit 500 of FIG. 7 and FIG. 8). In an example, the wireless communication circuit may change the electrical connection state of the switch circuit 530 according to frequency bands of RF signals radiated from the first antenna including the first area ($A_1$) of the first conductive portion 4111 and/or the second antenna including the slit (S).

The electronic device 400 of an embodiment may dispose the switch circuit 530 between the first antenna including the first area ($A_1$) of the first conductive portion 4111 and the second antenna including the slit (S), and may selectively connect the second conductive portion 4112 to the ground of the printed circuit board 440 or the passive element 540 through the switch circuit 530. As a result, the above-described electronic device 400 may improve the isolation between the first antenna including the first area ($A_1$) of the first conductive portion 4111 and the second antenna including the slit (S), or improve the antenna performance (e.g., radiation performance) of the second antenna.

An electronic device (e.g., the electronic device 300 of FIG. 3 and/or the electronic device 400 of FIG. 4) of an embodiment of the present disclosure may include a side member (e.g., the side member 310 of FIG. 3 and/or the side member 410 of FIG. 4) forming a side surface of the electronic device, the side member including a first conductive portion (e.g., the first conductive portion 4111 of FIG. 4), a second conductive portion (e.g., the second conductive portion 4112 of FIG. 4) adjacent to the first conductive portion, a first non-conductive portion (e.g., the first non-conductive portion 4114 of FIG. 4) disposed between the first conductive portion and the second conductive portion, and a slit (e.g., S of FIG. 4) formed in an area adjacent to the second conductive portion, a printed circuit board (e.g., the printed circuit board 440 of FIG. 4) including the ground, and a wireless communication circuit (e.g., the wireless communication circuit 500 of FIG. 6) electrically connected to the first conductive portion and the second conductive portion. The first conductive portion may include a first electrical path (e.g., the first electrical path ($L_1$) of FIG. 6) formed between a first point (e.g., the first point ($P_1$) of FIG. 6) of the first conductive portion and the wireless communication circuit and a second electrical path (e.g., the second electrical path ($L_2$) of FIG. 6) formed between a second point (e.g., the second point ($P_2$) of FIG. 6) of the first conductive portion and the ground. The second conductive portion may include a third electrical path (e.g., the fourth electrical path ($L_4$) of FIG. 6) formed between a third point (e.g., the fourth point ($P_4$) of FIG. 6) of the second conductive portion and the wireless communication circuit and a fourth electrical path (e.g., the fifth electrical path ($L_5$) of FIG. 6) formed between a fourth point (e.g., the fifth point ($P_5$) of FIG. 6) of the second conductive portion and the ground. A capacitor (e.g., the capacitor 510 of FIG. 6) may be disposed on the third electrical path. The wireless communication circuit may feed an RF signal of a first frequency band to the first conductive portion via the first electrical path, and feed an RF signal of a second frequency band at least partially overlapping with the first frequency band to the second conductive portion via the third electrical path.

In an example, at least a part (e.g., the first area ($A_1$) of FIG. 6) of the first conductive portion operates as an antenna radiator for transmitting or receiving an RF signal of a first frequency band.

In an example, the slit (e.g., the slit (S) of FIG. 6) may operate as a slit antenna for transmitting or receiving an RF signal of a second frequency band.

In an example, the first frequency band and the second frequency band may be the same as each other.

In an example, the first conductive portion and the slit may operate as a multiple input and multiple output (MIMO) antenna.

In an example, the first frequency band or the second frequency band may be a frequency band of 2.2 GHz or more and 2.7 GHz or less.

In an example, the wireless communication circuit may be configured to support a WiFi protocol.

In an example, the second conductive portion may further include a fifth electrical path (e.g., the eighth electrical path ($L_8$) of FIG. 10) formed between a fifth point (e.g., the eighth point ($P_8$) of FIG. 10), adjacent to the first conductive portion, of the second conductive portion and the ground of the printed circuit board, and a first passive element (e.g., the passive element 520 of FIG. 10) may be disposed on the fifth electrical path.

In an example, the fifth point of the second conductive portion may be located between the first point of the first conductive portion and the third point of the second conductive portion.

In an example, the second conductive portion may be electrically connected to a switch circuit (e.g., the switch circuit 530 of FIG. 13) at a fifth point (e.g., the eighth point ($P_8$) of FIG. 13) adjacent to the first conductive portion, and the switch circuit may selectively connect the second conductive portion to a second passive element (e.g., the passive element 540 of FIG. 13) or the ground of the printed circuit board (e.g., the printed circuit board 440 of FIG. 13).

In an example, the electronic device may further include a processor (e.g., the processor 600 of FIG. 13) electrically connected to the switch circuit, and the processor may be configured to control an electrical connection state of the switch circuit.

In an example, the side surface may include a first side surface (e.g., the fourth side surface 410a of FIG. 2A) extending along a first direction, a second side surface (e.g., the third side surface 410c of FIG. 4) parallel to the first side surface, a third side surface (e.g., the second side surface 410b of FIG. 4) extending along a second direction perpendicular to the first direction, and connecting one end of the first side surface and one end of the second side surface, and a fourth side surface (e.g., the first side surface 410a of FIG. 4) parallel to the third side surface and connecting the other end of the first side surface and the other end of the second side surface.

In an example, the first conductive portion may be disposed in at least one area of the second side surface and at least one area of the third side surface, and the second conductive portion may be adjacent to the first conductive portion and be disposed on the third side surface.

In an example, the first conductive portion may further include a first protrusion (e.g., the first protrusion ($E_1$) of FIG. 6) protruding toward the printed circuit board at the first point.

In an example, the second conductive portion may further include a second protrusion (e.g., the third protrusion ($E_3$) of FIG. 10) protruding toward the printed circuit board at the third point, and a third protrusion (e.g., the sixth protrusion ($E_6$) of FIG. 10) protruding toward the printed circuit board at the fifth point.

An electronic device (e.g., the electronic device 300 of FIG. 3 or the electronic device 400 of FIG. 4) of another embodiment of the present disclosure may include a printed circuit board (e.g., the printed circuit board 340 of FIG. 3 or the printed circuit board 440 of FIG. 4) including the ground, a side member (e.g., the side member 410 of FIG. 4) including a first structure (e.g., the first structure 411 of FIG. 4) forming a side surface of the electronic device and a second structure (e.g., the second structure 412 of FIG. 4) supporting at least one area of the printed circuit board, the first structure of the side member including a first conductive portion (e.g., the first conductive portion 4111 of FIG. 4), a second conductive portion (e.g., the second conductive portion 4112 of FIG. 4) adjacent to one end of the first conductive portion, a third conductive portion (e.g., the third conductive portion 4113 of FIG. 4) adjacent to the other end of the first conductive portion, a first non-conductive portion (e.g., the first non-conductive portion 4114 of FIG. 4) disposed between the first conductive portion and the second conductive portion, and a second non-conductive portion (e.g., the second non-conductive portion 4115 of FIG. 4) disposed between the first conductive portion and the third conductive portion, and the second structure of the side member including a conductive area (e.g., the conductive area 4121 of FIG. 4), a non-conductive area (e.g., the non-conductive area 4122 of FIG. 4), and a slit (e.g., S of FIG. 4) formed in an area adjacent to the second conductive portion among the conductive area, and a wireless communication circuit (e.g., the wireless communication circuit 500 of FIG. 6) disposed on the printed circuit board. The first conductive portion may include a first area (e.g., the first area ($A_1$) of FIG. 6 or FIG. 7) adjacent to the second conductive portion and a second area (e.g., the second area ($A_2$) of FIG. 6 or FIG. 7) adjacent to the third conductive portion. The first area of the first conductive portion may include a first electrical path (e.g., the first electrical path ($L_1$) of FIG. 6 or FIG. 7) formed between a first point (e.g., the first point ($P_1$) of FIG. 6 or FIG. 7) of the first area and the wireless communication circuit and a second electrical path (e.g., the second electrical path ($L_2$) of FIG. 6 or FIG. 7) formed between a second point (e.g., the second point ($P_2$) of FIG. 6 or FIG. 7) of the first area and the ground. The second conductive portion may include a third electrical path (e.g., the fourth electrical path ($L_4$) of FIG. 6 or FIG.

7) formed between a third point (e.g., the fourth point ($P_4$) of FIG. 6 or FIG. 7) of the second conductive portion and the wireless communication circuit and a fourth electrical path (e.g., the fifth electrical path ($L_5$) of FIG. 6 or FIG. 7) formed between a fourth point (e.g., the fifth point ($P_5$) of FIG. 6 or FIG. 7) of the second conductive portion and the ground. A capacitor (e.g., the capacitor 510 of FIG. 6) may be disposed on the third electrical path. The wireless communication circuit may feed an RF signal of a first frequency band to the first area of the first conductive portion via the first electrical path, and feed an RF signal of a second frequency band at least partially overlapping with the first frequency band to the second conductive portion via the third electrical path.

In an example, the second area of the first conductive portion may further include a fifth electrical path (e.g., the third electrical path ($L_3$) of FIG. 6) formed between a fifth point (e.g., the third point ($P_3$) of FIG. 6) of the second area and the wireless communication circuit, and the wireless communication circuit may feed an RF signal of a third frequency band to the second area of the first conductive portion via the fifth electrical path.

In an example, the electronic device may further include a first conductive pattern (e.g., the first conductive pattern 451 of FIG. 4) disposed in the non-conductive area, and electrically connected to the wireless communication circuit, and the wireless communication circuit may feed an RF signal of a fourth frequency band (e.g., a frequency band of about 5.1 GHz to about 5.8 GHz) to the first conductive pattern.

In an example, the electronic device may further include a second conductive pattern (e.g., the second conductive pattern 452 of FIG. 4) disposed in the non-conductive area, and electrically connected to the wireless communication circuit, and the wireless communication circuit may feed an RF signal of a fifth frequency band (e.g., a frequency band of about 3.3 GHz to about 3.8 GHz) to the second conductive pattern.

In an example, the electronic device may further include a third conductive pattern (e.g., the third conductive pattern 453 of FIG. 4) disposed in the non-conductive area, and electrically connected to the wireless communication circuit, and the wireless communication circuit may feed the RF signal of the fifth frequency band to the third conductive pattern.

In the specific embodiments of the present disclosure described above, components included in the disclosure are expressed in the singular or plural according to the specific embodiments presented. However, the singular or plural expression is appropriately selected for a context presented for description convenience's sake, and the present disclosure is not limited to the singular or plural component, and even the component expressed in the plural may be composed of the singular component, or even the component expressed in the singular may be composed of the plural component.

Although embodiments have been described in the detailed description of the present disclosure, various modifications are possible without departing from the scope of the present disclosure. Therefore, the scope of the present disclosure should not be limited to and defined by the described embodiments and should be defined by not only the claims described below but also equivalents to these claims.

What is claimed is:

1. An electronic device comprising:
a side member forming a side surface of the electronic device, the side member comprising:
a first conductive portion,
a second conductive portion adjacent to the first conductive portion,
a first non-conductive portion provided between the first conductive portion and the second conductive portion, and
a slit formed in an area adjacent to the second conductive portion;
a printed circuit board comprising a ground;
a capacitor; and
a wireless communication circuit electrically connected to the first conductive portion and the second conductive portion,
wherein the first conductive portion comprises a first electrical path between a first point of the first conductive portion and the wireless communication circuit and a second electrical path between a second point of the first conductive portion and the ground,
wherein the second conductive portion comprises a third electrical path between a third point of the second conductive portion and the wireless communication circuit and a fourth electrical path between a fourth point of the second conductive portion and the ground,
wherein the capacitor is provided on the third electrical path, and
wherein the wireless communication circuit is configured to feed a radio frequency (RF) signal of a first frequency band to the first conductive portion via the first electrical path, and feed an RF signal of a second frequency band to the second conductive portion via the third electrical path, and the second frequency band at least partially overlaps the first frequency band.

2. The electronic device of claim 1, wherein at least a part of the first conductive portion is configured to operate as an antenna radiator for transmitting or receiving the RF signal of the first frequency band.

3. The electronic device of claim 1, wherein the slit is configured to operate as a slit antenna for transmitting or receiving the RF signal of the second frequency band.

4. The electronic device of claim 1, wherein the first frequency band and the second frequency band are substantially the same as each other.

5. The electronic device of claim 4, wherein the first conductive portion and the slit are configured to operate as a multiple input and multiple output (MIMO) antenna.

6. The electronic device of claim 4, wherein the first frequency band or the second frequency band is 2.2 GHz to 2.7 GHz.

7. The electronic device of claim 4, wherein the wireless communication circuit is further configured to support a WiFi protocol.

8. The electronic device of claim 1, wherein the second conductive portion further comprises a fifth electrical path between a fifth point, adjacent to the first conductive portion, of the second conductive portion and the ground of the printed circuit board, and
wherein the electronic device further comprises a first passive element provided on the fifth electrical path.

9. The electronic device of claim 8, wherein the fifth point of the second conductive portion is located between the first point of the first conductive portion and the third point of the second conductive portion.

10. The electronic device of claim 8, wherein the second conductive portion further comprises:
- a second protrusion protruding toward the printed circuit board at the third point; and
- a third protrusion protruding toward the printed circuit board at the fifth point.

11. The electronic device of claim 1, further comprising a switch circuit at a fifth point adjacent to the first conductive portion,
- wherein the second conductive portion is electrically connected to the switch circuit, and
- wherein the switch circuit is configured to selectively connect the second conductive portion to a second passive element or the ground of the printed circuit board.

12. The electronic device of claim 11, further comprising:
a processor electrically connected to the switch circuit and configured to control an electrical connection state of the switch circuit.

13. The electronic device of claim 1, wherein the side surface comprises:
- a first side surface extending along a first direction;
- a second side surface parallel to the first side surface;
- a third side surface extending along a second direction perpendicular to the first direction, and connecting a first end of the first side surface and a first end of the second side surface; and
- a fourth side surface parallel to the third side surface and connecting a second end of the first side surface and a second end of the second side surface.

14. The electronic device of claim 13, wherein the first conductive portion is provided in at least one area of the second side surface and at least one area of the third side surface, and
- wherein the second conductive portion is adjacent to the first conductive portion and is provided on the third side surface.

15. The electronic device of claim 1, wherein the first conductive portion further comprises a first protrusion protruding toward the printed circuit board at the first point.

16. An electronic device comprising:
- a printed circuit board including a ground,
- a side member including a first structure forming a side surface of the electronic device, and a second structure supporting at least one area of the printed circuit board, wherein the first structure of the side member includes a first conductive portion, a second conductive portion adjacent to one end of the first conductive portion, a third conductive portion adjacent the other end of the first conductive portion, a first non-conductive portion disposed between the first conductive portion and the second conductive portion, and a second non-conductive portion disposed between the first conductive portion and the third conductive portion, and wherein the second structure of the side member includes a conductive area, non-conductive area and a slit formed in an area adjacent to the second conductive portion among the conductive area; and
- a wireless communication circuit disposed on the printed circuit board,
- wherein the first conductive portion includes a first area adjacent to the second conductive portion and a second area adjacent to the third conductive portion,
- wherein the first area of the first conductive portion includes a first electrical path formed between a first point of the first area and the wireless communication circuit, and a second electrical path formed between a second point of the first area and the ground,
- wherein the second conductive portion includes a third electrical path formed between a third point of the second conductive portion and the wireless communication circuit, and a fourth electrical path formed between a fourth point of the second conductive portion and the ground,
- wherein a capacitor is disposed on the third electrical path,
- wherein the wireless communication circuit is configured to:
  - feed an RF (radio frequency) signal of a first frequency band to the first area of the first conductive portion via the first electrical path,
  - feed an RF signal of a second frequency band at least partially overlapping with the first frequency band to the second conductive portion via the third electrical path.

17. The electronic device of claim 16,
- wherein the second area of the first conductive portion includes a fifth electrical path formed between a fifth point of the second area and the wireless communication circuit, and
- wherein the wireless communication circuit is configured to feed an RF signal of a third frequency band to the second area of the first conductive portion via the fifth electrical path.

18. The electronic device of claim 16, further comprising:
a first conductive pattern disposed in the non-conductive area and electrically connected to the wireless communication circuit,
- wherein the wireless communication circuit is configured to feed an RF signal of a fourth frequency band to the first conductive pattern.

19. The electronic device of claim 18, further comprising:
a second conductive pattern disposed in the non-conductive area and electrically connected to the wireless communication circuit,
- wherein the wireless communication circuit is configured to feed an RF signal of a fifth frequency band to the second conductive pattern.

20. The electronic device of claim 19, further comprising:
a third conductive pattern disposed in the non-conductive area and electrically connected to the wireless communication circuit,
- wherein the wireless communication circuit is configured to feed the RF signal of the fifth frequency band to the third conductive pattern.

* * * * *